United States Patent [19]

Yamaguchi et al.

[11] Patent Number: 5,390,003
[45] Date of Patent: Feb. 14, 1995

[54] COPYING SYSTEM FOR PREVENTING COPYING OF COPY-PROHIBITED IMAGES

[75] Inventors: Ikunori Yamaguchi, Toyokawa; Keiji Nakatani, Aichi; Miho Ataka, Nara, all of Japan

[73] Assignee: Minolta Camera Kabushiki Kaisha, Osaka, Japan

[21] Appl. No.: 159,478

[22] Filed: Nov. 30, 1993

[30] Foreign Application Priority Data

Nov. 30, 1992 [JP] Japan .................. 4-345359
Oct. 29, 1993 [JP] Japan .................. 5-272232

[51] Int. Cl.$^6$ ............................. G03G 21/00
[52] U.S. Cl. ................... 355/201; 355/203; 382/7
[58] Field of Search ............ 355/201, 206, 207, 203, 355/204, 133; 430/10; 283/902, 72; 356/71; 382/7

[56] References Cited

U.S. PATENT DOCUMENTS

| 4,583,834 | 4/1986 | Seko et al. |
|---|---|---|
| 5,216,724 | 6/1993 | Suzuki et al. .................. 382/7 |
| 5,321,470 | 6/1994 | Hasuo et al. .................. 355/201 |

FOREIGN PATENT DOCUMENTS

| 342060 | 11/1989 | European Pat. Off. ............ 355/201 |
|---|---|---|
| 54-44522 | 4/1979 | Japan . |
| 54-54032 | 4/1979 | Japan . |
| 55-111977 | 8/1980 | Japan . |
| 2-73283 | 3/1990 | Japan . |
| 2-210591 | 8/1990 | Japan . |
| 4-50958 | 2/1992 | Japan . |

OTHER PUBLICATIONS

*Patent Abstracts of Japan*, vol. 14, No. 504 (P1127), Published Nov. 5, 1990, Patent 02-210481 Published Aug. 21, 1990.
*Patent Abstracts of Japan*, vol. 14, No. 438(P1108), Published Sep. 19, 1990, Patent 02-171790 Published Jul. 3, 1990.
*Patent Abstracts of Japan*, vol. 14, No. 438(P1108), Published Sep. 19, 1990, Patent 02-171780 Published Jul. 3, 1990.
*Patent Abstracts of Japan*, vol. 14, No. 122(P1017), Published Mar. 7, 1990, Patent 01-316783 Published Dec. 21, 1989.
*Patent Abstracts of Japan*, vol. 14, No. 122(P1017), Published Mar. 7, 1990, Patent 01-316782 Published Dec. 21, 1989.
*Patent Abstracts of Japan*, vol. 14, No. 64(P1002), Published Feb. 6, 1990, Patent 01-285978 Published Nov. 6, 1989.
*Patent Abstracts of Japan*, vol. 14, No. 64(P1002), Published Feb. 6, 1990, Patent 01-285977 Published Nov. 16, 1989.
*Patent Abstracts of Japan*, vol. 13, No. 269(P888), Published Jun. 21, 1989, Patent 01-61777 Published Mar. 8, 1989.

*Primary Examiner*—R. L. Moses
*Attorney, Agent, or Firm*—Burns, Doane, Swecker & Mathis

[57] ABSTRACT

An image forming system, for preventing forgery of paper money, a check, securities or the like, having a plurality of copying apparatuses, and a controller, for controlling each of the copying apparatuses, connected with them through a communication line. The copying apparatus includes a reader which reads an image as of the paper money, etc. and which outputs image data corresponding to the image; a printer for printing the image read by the reader on paper; a first transmitter for transmitting the image data to the controller through the communication line; and a prohibiting device for prohibiting an operation of the printer. A signal, which prohibits copying, is transmitted from the controller to the copying apparatus. The controller includes a deciding device for deciding whether or not the data received from the copying apparatus corresponds to an image which is prohibited from being copied; and a second transmitter for transmitting the signal which prohibits copying to the copying apparatus through the communication line, if the deciding device decides that the data received from the copying apparatus corresponds to the image which is prohibited from being copied.

38 Claims, 20 Drawing Sheets

COPYING SYSTEM FOR PREVENTING COPYING OF COPY-PROHIBITED IMAGES

BACKGROUND OF THE INVENTION

1. Field of the Invention

The present invention generally relates to a copying system which makes it possible to communicate between a user and a controller through a communication line, and particularly relates to the system having a function to prevent the attempt of copying paper money, a check, securities or the like.

2. Description of the Related Arts

Copying apparatuses having a function to prevent the image of a bill, a check or valuable securities from being copied are disclosed, for example, in Japanese Laid-Open Patent (Unexamined) Publication Nos. 55-111977, 2-73283 and 2-210591.

Regarding an apparatus disclosed in the Publication No. 55-111977, while copying operation is being performed, a pattern of an original document is detected to compare the pattern with a copy-prohibited reference pattern. If the pattern of the original document is coincident with the reference pattern, the image formation of the original document on copy sheets is prevented.

Regarding an apparatus disclosed in the Publication No. 2-73283, it is decided whether or not an image of an original document is a copy-prohibited one while the image of the original document is being read and recorded. If it is decided that the image of the original document is a copy-prohibited image, solid black is written on the image which has been recorded.

Regarding an apparatus disclosed in the Publication No. 2-210591, a position of an original document is detected to detect an image pattern of a particular portion of the original document so as to detect the degree of similarity of the image pattern to a registered reference pattern. Based on the degree of similarity, it is decided whether or not the original document is a bill or the like.

On the other hand, in Japanese Laid-Open Patent (Unexamined) Publication No. 54-54032 is disclosed an apparatus in which data to control a plurality of copying apparatuses is transmitted to a centralized control device so that the latter executes batch processing.

And, in Japanese Laid-Open Patent (Unexamined) Publication No. 54-44522 is disclosed an apparatus in which data to control each copying apparatus is transmitted to a centralized control device through each terminal device so that the central processing unit controls a plurality of copying apparatuses.

Furthermore, in Japanese Laid-Open Patent (Unexamined) Publication No. 4-50958 are disclosed copying apparatuses that are controlled by a controlling center or a service center on an on-line system.

The apparatuses disclosed in Japanese Laid-Open Patent Publication Nos. 55-111977, 2-73283 and 2-210591 are intended to make it impossible to copy the image of a bill, a check, valuable securities or the like, but they do not have a function to prevent the attempt of a copying operation itself. In each apparatus, reference patterns of a bill, a check, valuable securities or the like are registered to compare the patterns of the original documents with the reference patterns, and it is decided whether or not the patterns of the original documents are copy-prohibited patterns by comparing these patterns with each other. Namely, these apparatuses must have a bigger memory for allowing these data to be stored; therefore, the construction of each apparatus inevitably becomes complicated, thus leading to a higher production cost. Also, there is a possibility that the pattern of a bill, a check or valuable securities may be altered. There may also be a case that one wants to prohibit a specified pattern from being copied. The abovementioned apparatuses, however, are not able to meet such a requirement.

SUMMARY OF THE INVENTION

It is accordingly one object of the present invention to prevent a copy-prohibited image as of paper money, a check, securities or the like from being copied and to inform a controller of an attempt of copying such an image if the attempt is made.

Another object of the present invention is, in addition to the above object, to be able to easily alter a reference pattern of the copy-prohibited image.

Still another object of the present invention is, in addition to both of the above objects, to provide a cheaper copying apparatus having a smaller memory.

In carrying out our invention in one preferred mode, there is provided a copying apparatus comprising: reading means for reading an image of an original document and outputting image data corresponding to the image read; recording means for recording the image corresponding to the image data on paper; deciding means for deciding whether or not the image read corresponds to an image as of a bill, a check, securities or the like which is prohibited from being copied; calling means for calling a desired called party via a communication line; and transmitting means for transmitting a result of decision made by the deciding means to the called party by actuating the calling means, when it is decided by the deciding means that the image read by the reading means corresponds to the image which is prohibited from being copied.

According to the above construction, if the deciding means decides that the image read by the reading means corresponds to the copy-prohibited image which is prohibited from being copied, data of the copy-prohibited image is transmitted via the communication line to the desired called party by actuating the calling means; therefore, an attempt of copying the copy-prohibited image can be known on the side of the called party. Also, by making known the fact that the copying apparatus is provided with the deciding means to decide whether or not the image tried to be copied corresponds to the copy-prohibited image, and by making known the fact that the attempt of copying such a copy-prohibited image is reported to a third person if the attempt is made, any wrong attempt of forgery is surely prevented.

Preferably, the transmitting means is constructed to transmit data for specifying the copying apparatus to the called party together with a result of decision made by the deciding means. According to this construction, the copying apparatus used for copying such a copy-prohibited image can be specified on the side of the called party.

Preferably, the copying apparatus is provided with data storing means for storing data used to call each of the desired called party arranged in an order of priority, wherein the called party is called one by one according to the order of priority when the called party in the highest priority cannot be called. According to this construction, when such a wrong attempt of forgery is made, the attempt is more surely reported to a third person.

Preferably, the copying apparatus is provided with control means for controlling the recording means so as to record a predetermined image on the image corresponding to the image data read by the reading means, when the image read thereby is decided by the deciding means as the copy-prohibited image, thus making any user give up the wrong attempt of forgery.

Preferably, the copying apparatus is provided with state-memorizing means for collecting and storing data with respect to a state of the copying apparatus, and transmission controlling means for controlling a timing of transmitting the data with respect to the state of the copying apparatus to the controller, wherein the transmitting means transmits the data stored in the state-memorizing means to the controller through the communication line, based on the timing controlled by the transmission controlling means. According to this construction, on the side of the called party, one can regularly monitor the state or condition of the copying apparatus such as that of a trouble occurrence.

In carrying out our invention in another preferred mode, there is provided a controlling system having a plurality of copying apparatuses and a controller, for controlling each of the copying apparatuses, connected with the copying apparatuses through a communication line, in which the copying apparatus comprises: reading means for reading an image of an original document and outputting image data corresponding to the image read; recording means for recording the image corresponding to the image data on paper; information storing means for storing information upon deciding whether or not the data read by the reading means corresponds to an image which is prohibited from being copied; deciding means for deciding whether or not the image read by the reading means corresponds to the image which is prohibited from being copied, based on the information stored in the information storing means; and information updating means for updating the information stored in the information storing means, according to a signal transmitted from the controller through the communication line.

According to this construction, when a signal for specifying the copy-prohibited image is transmitted from the controller to each copying apparatus through the communication line, previous information or reference pattern stored in the information storing means is updated by the information updating means of the copying apparatus. Thereafter, the deciding means decides whether or not the image read by the reading means corresponds to the copy-prohibited image, based upon the updated reference pattern. Because it is unnecessary for a service man to visit respective copying apparatuses in order to update the reference pattern, one can do the work of rewriting the pattern very efficiently and speedily.

In carrying out our invention in still another preferred mode, there is provided a controlling system having a plurality of copying apparatuses and a controller, for controlling each of the copying apparatuses, connected with the copying apparatuses through a communication line, in which the copying apparatus comprises: reading means for reading an image of an original document and outputting image data corresponding to the image read; recording means for recording the image corresponding to the image data on paper; first transmitting means for transmitting the image data to the controller through the communication line; and prohibiting means for prohibiting an operation of the recording means in response to a signal, which prohibits copying, transmitted from the controller, Whereas the controller comprises: deciding means for deciding whether or not the data received from the copying apparatus corresponds to an image which is prohibited from being copied; and second transmitting means for transmitting the signal which prohibits copying to the copying apparatus through the communication line if the deciding means decides that the data received from the copying apparatus corresponds to the image which is prohibited from being copied.

According to this construction, because the deciding means, which decides whether or not the image data read by the reading means in each copying apparatus corresponds to the image which is prohibited from being copied, is provided on the side of the controller, the construction of each copying apparatus is simplified, thus making the production cost of each copying apparatus, therefore, the production cost of the controlling system, substantially lower.

Preferably, the controller is provided with display means for displaying an image corresponding to the image data outputted from the copying apparatus when the deciding means decides that the data received from the copying apparatus corresponds to the image which is prohibited from being copied. According to this construction, in case that a wrong attempt of copying a copy-prohibited image is made on the side of the copying apparatus, one can specify the image tried to be copied on the side of the controller.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE INVENTION

Figure 1:
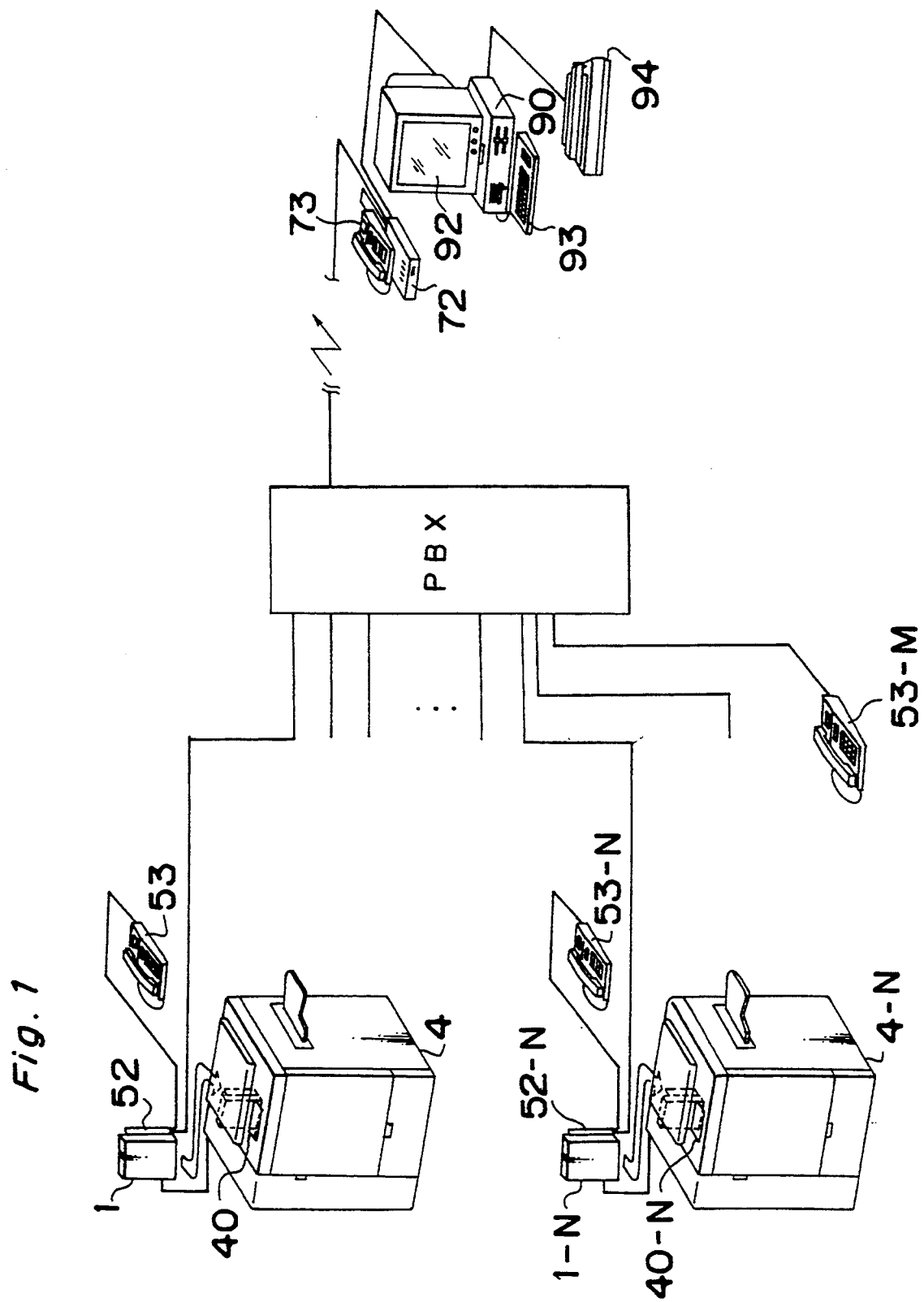
FIG. 1 is a general view showing an entire copying system comprising a plurality of copying apparatuses and its controller, according to an embodiment of the present invention.

Before the description of the present invention proceeds, it is to be noted that like parts are designated by like reference numerals throughout the accompanying drawings.

One of copying apparatuses and its controller (i.e. apparatuses on the side of a service center) according to an embodiment of the present invention are described below with reference to FIGS. 1-22.

The embodiment is described in the order of:

(1) Copying system comprising copying apparatuses and its controller,
(2) Mechanism of a copying apparatus,
(3) Bill-detecting method used by the copying apparatus, and
(4) Data communication between the copying apparatus, and its controller in the service center.

(1) Copying system comprising copying apparatuses and its controller (1—1) Outline of the copying system

Referring to FIG. 1, a digital color copying apparatus 4 according to the embodiment is connected with a copying apparatus 4-N installed in the same private branch through a path of data terminal DT1—modem 52—inner line—private branch exchange (PBX)—inner line—modem 52-N of the copying apparatus 4-N—data terminal DT1-N of the copying apparatus 4-N. The copying apparatus 4 is also connected with a host computer 90 of a service center through a path of data terminal DT1—modem 52—inner line—PBX—outer line—modem 72 of service center.

The system comprises a plurality of apparatuses installed on users'side, apparatuses constituting its controller on the side of the service center, and communication lines connecting these apparatuses to each other. FIG. 1 shows a plurality of apparatuses on one user's side (installed in the same private branch). That is, the user's system comprises N pieces of copying apparatuses 4, N pieces of data terminals DT1, N pieces of modems 52, N pieces of telephones 53 connected with the modems, M pieces of independent telephones 53', and a PBX of analog type. In the description below, one arbitrary copying apparatus of N pieces of copying apparatuses or one arbitrary data terminal DT1 of N pieces of data terminals DT1 is denoted respectively as a copying apparatus 4-i or a data terminal DT1-i, or as a copying apparatus 4-j or a data terminal DT1-j.

The data terminal DT1 executes predetermined processing upon reception of various information from the copying apparatus 4 connected thereto and it allows data communication between the copying apparatus 4 and another copying apparatus 4 in the same private branch or between the copying apparatus 4 and the apparatus on the side of service center through each communication line by actuating the modem 52. For example, when an attempt to copy the same image of a bill, a check, valuable securities, a credit voucher or the like as one of predetermined copy-prohibited images registered in EEP-ROM (see FIG. 3) is made, the data terminal DT1 allows data communication with the service center so as to transmit the information of the copying operation to the service center. If the communication line between the copying apparatus 4 and service center is busy, the information of the copying operation is transmitted to a different apparatus through inner line—PBX—outer line or inner line—PBX—inner line.

In data communication from a modem 52-i of a data terminal DT1-i to a modem 52-j of a data terminal DT1-j through an inner line, the extension number of the modem 52-i is transmitted to the modem 52-j via the PBX. After both modems 52-i and 52-j are connected to each other, data communication between the data terminals DT1-i and DT1-j through the inner line becomes possible. In the case of data communication through the outer line, "0" is dialed as the selection number of the outer line before the telephone number of the service center is dialed.

A computer having a CPU 91 (see FIG. 4) is installed on the side of the service center. The CPU 91 is connected with a communication line via a modem 72 functioning as a terminal unit. That is, the CPU 91 is connected with the modem 72 via a communication I/F (RS 232C I/F) 98 of the CPU 91 and an I/F (RS 232C I/F) 71 of the modem 72. The CPU 91 is also connected with a display 92, a key board 93, a printer 94, and a RAM 97. The cpu manages each copying apparatus of each user.

The CPU 91 processes the following various kinds of data of the copying apparatus 4-k transmitted from the user to the service center via the modem 72, the I/F (RS 232C I/F) 71 of the modem 72, and the I/F (RS 232C I/F) 98 of the CPU 91. The data, for example, includes element data indicating the state of the copying apparatus 4-k, count data indicating the number of image-copied sheets, data that the image of a bill and so on has been copied by the copying apparatus 4-k. In this manner, the data for managing the copying apparatus 4-k is generated or updated. In periodic data communication between the copying apparatus 4-k and the service center at predetermined times, the service center transmits, to the user, data of copy-prohibited images of a bill and so on, and a program in which algorithm for deciding whether or not the image of a document copied out is a copy-prohibited image is described. In this manner, the data of the copying apparatus 4-k is updated.

(1-2) Construction of circuit in the system

Figure 3:
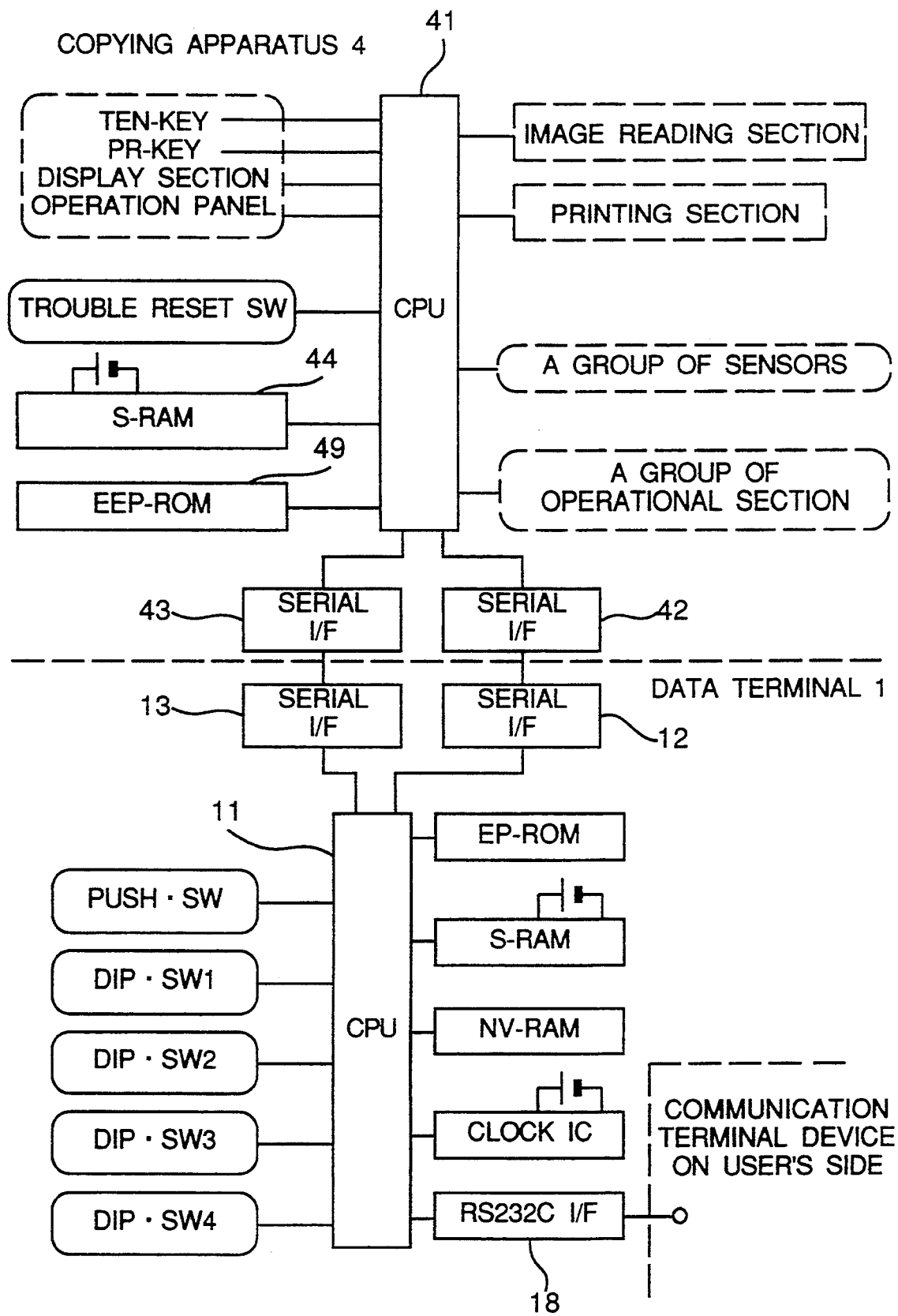
FIG. 3 is a block diagram showing a part of the circuit of the copying apparatus shown in FIG. 2.
Figure 4:
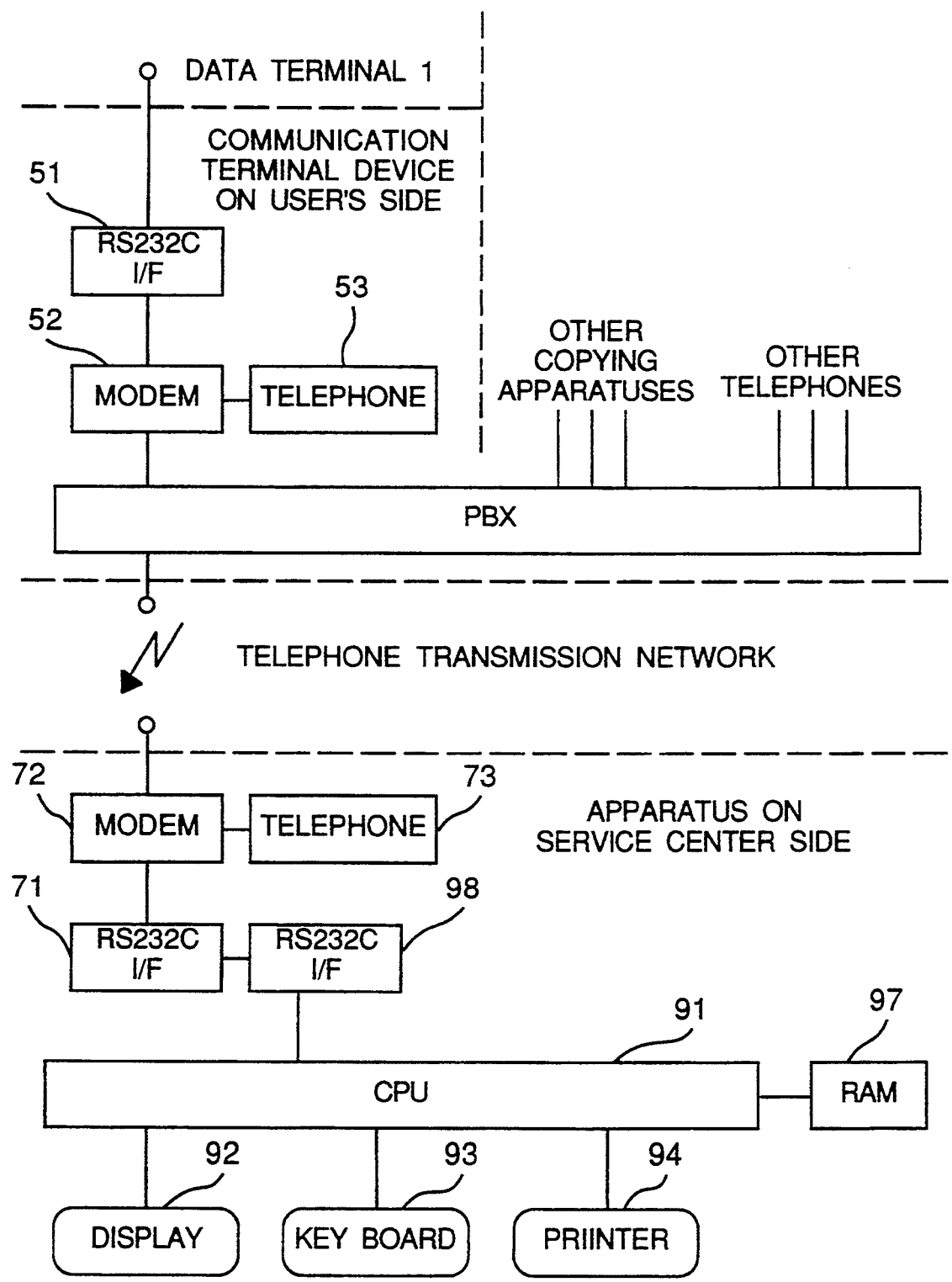
FIG. 4 is a block diagram showing the remaining part of the circuit of the copying apparatus shown in FIG. 2 and the circuit of its controller shown in FIG. 1.

The construction of the circuit of the above controller is described below with reference to FIGS. 3 and 4.

In the copying apparatus 4, various kinds of element data which influence the process of an image formation is detected by sensors installed inside the copying apparatus 4. The element data includes time required to transport copy sheets, a voltage on the surface of a photosensitive drum, the density of toner contained in developer, a quantity of exposure of the photosensitive drum, a developing bias voltage, the amount of toner attracted to the photosensitive drum, a grid voltage of a charger, temperature, moisture and so on at specified locations of the copying apparatus 4. After the above data is processed by the CPU 41 of the copying apparatus 4, it is sent to the CPU 11 of the data terminal DT1 via a pair of serials I/F 43 and I/F 13. When it is detected by an image reading section of the copying apparatus 4 that the same image of a bill or the like as a copy-prohibited image has been read, the information is transmitted to the CPU 11 of the data terminal DT1. The detecting method will be described later.

The CPU 41 of the copying apparatus 4 calculates a count value of a counter (a total counter indicating the number of copy paper discharged from the copying apparatus 4 and a counter indicating the number of copy paper used per each size (per each paper supply opening)) serving as the base data of an amount claimed by the service center; and a count value of a counter (a jam counter indicating the number of times of jam at each portion, a trouble counter indicating the number of times of troubles at each portion, a PM counter indicating the number of times of use of each component) serving as a reference of maintenance. The data of values thus counted is transmitted to the CPU 11 of the data terminal DT1 via a pair of serials I/F 42 and I/F 12.

The CPU 41 of the copying apparatus 4 is connected with an image reading section and a printing section thereof; a first group of key switches disposed on an operation panel 40; and a second group of switches disposed at locations other than the operation panel 40. The first group of key switches include a print key for instructing the start of copying operation, a ten-key for inputting numerical values, a clear key for instructing the clearance of inputted information, and the like, and the second group of switches include trouble reset switches for instructing the reset of trouble. There is provided, on the operation panel 40, a display section for displaying, for example, a message indicating various conditions of the copying apparatus 4 such as jam which has occurred at paper feeding section during warm-up, or a message indicating the provision of a countermeasure against copying a copy-prohibited image corresponding to that of a bill or the like.

The CPU 41 is also connected with a RAM 44 and an EEP-ROM 49.

The RAM 44 stores the model name of the copying apparatus 4, the serial number thereof, and so on when the copying apparatus 4 is delivered out from a factory. The data is transmitted to the CPU 11 of the data terminal DT1 via the serials I/F 42 and I/F 12 when the data terminal DT1 is installed on the copying apparatus 4.

The EEP-ROM 49 stores a reference pattern used to detect a copy-prohibited image of a bill or the like. The reference pattern is rewritable based on an instruction issued by the service center. The detecting method and down-load method are described later.

Various kinds of data of the copying apparatus 4 are collected and processed by the CPU 11 of the data terminal DT1. If a particular condition for calling the service center is satisfied, i.e., if the condition in which any one of transmission flags is set to "1" is satisfied, charging processing (see FIGS. 14–16) is executed and the modem 52 is actuated. As a result, the modem 52 is connected with the modem 72 of the service center via the communication line (inner line, PBX, and outer line), and data (such as element data, count data, data indicating that the image of a bill or the like has been copied) for controlling the copying apparatus 4 is transmitted to the CPU 91 of the service center. Upon reception of the controlling data, data is outputted from the service center to the CPU 11 so that predetermined processing is performed by the CPU 11. The kind of data to be transmitted from the CPU 11 to the service center is determined by the kind of transmission flag.

The CPU 11 of the data terminal DT1 is connected with the modem 52, serving as the communication terminal device on the user's side, via a communication I/F (RS232C I/F) 18 and a communication I/F (RS232C I/F) 51 of the modem 52. The modem 52 is connected with the PBX via the inner line. The PBX is connected with the modem 72 of the service center via an outer line (public telephone line).

The CPU 11 is connected with an EP-ROM storing a control program, a nonvolatile memory (NV-RAM) storing numerical data, a RAM, and a clock IC. In addition to an outer line selection number of the service center, the NV-RAM stores outer line selection numbers of other subordinate controllers, which may be dialed when the user cannot contact the service center; and inner line numbers of other copying apparatuses managed by the same PBX.

(2) Mechanism of a copying apparatus

The mechanism of the digital color copying apparatus 4 is described below with reference to FIG. 2. The copying apparatus 4 comprises the image reading section 30 and the printing section 20, as described previously.

In the image reading section 30, the image of an original document to be copied is read and electrical signals corresponding to the image are generated. Based on the electrical signals, image data for driving a laser diode is generated.

That is, the original document is placed on a glass 31, with the surface thereof from which an image is copied down, and then the document is scanned by a scanner 32 which is moved by the driving force of a pulse motor 36. An image sensor (CCD) 33 installed on the scanner 32 photoelectrically converts the image into electrical signals corresponding to it. Then, the electrical signals enter an image signal processing section 34 where they are processed in a predetermined way into image data for driving a laser diode. The image data is then sent to a print head control section 35.

In the printing section 20, an electrostatic latent image formed on the surface of a photosensitive drum 24 by means of laser beams L is developed with toner of cyan C, magenta M, yellow Y, black Bk, and then, the toner images of respective colors are sequentially transferred one over another to a copy sheet wound around a transfer drum 10. Then, the toner images thus formed are fixed with respect to the copy sheet by a fixing device 48 using heat and compression. If it is decided that the image of the original document is a copy-prohibited one, a font pattern of "invalid" instead of the image corresponding to the original document is written on the photosensitive drum 24 by the laser beams L when the electrostatic latent image to be developed with the black toner is formed.

A laser device 21 controlled by the print head control section 35 outputs the laser beams L. The laser beam L incident on the surface of the photosensitive drum 24 rotating at a constant speed is guided by an optical system provided in the laser device 21 so that the photosensitive drum 24 is scanned by the laser beams L in the axial direction thereof. As a result, the electrostatic latent image corresponding to the image data is formed on the surface of the photosensitive drum 24. The photosensitive drum 24 is uniformly charged on the upstream side of the incident position of the laser beams L.

The electrostatic latent image formed on the surface of the photosensitive drum 24 is developed into a visible image with a toner or toners selected from cyan, magenta, yellow, and black toner contained in each developing unit 6C, 6M, 6Y and 6K, all of which are installed in a developing device 6. A toner color or colors, namely, the developing unit or units is/are selected by an instruction from the CPU 41. A motor 61 drives the developing device 6 to move up and down so that a selected developing unit is set at the developing position.

The toner image developed into the visible one is transferred to the copy sheet wound around the transfer drum 10 by the attracting force of a transfer charger 14. The copy sheet is fed out from any one of paper trays 142–144 or a tray 50, guided to a pair of timing rollers 45 by a group of guiding rollers, and then wound around the transfer drum 10 at a predetermined timing. The printing section 20 comprises an attracting charger 111 for attracting sheets to the transfer drum, deelectrifying chargers 16 and 17 for separating the copy sheet therefrom, and a separating claw 180 for separating the copy sheet from the transfer drum 10. The photosensitive drum 24 and the transfer drum 10 are synchronously driven by a drum-driving motor 22.

The copy sheet to which toner images of one, two, three or four colors have been transferred is removed from the transfer drum 10, and then carried to the fixing device 48 by a carrying belt 47 so that the fixing device 48 fixes the toner image to the sheet by means of heat and compression. Then, the copy sheet is discharged to a paper discharge tray 490 or accommodated in the tray 50. When the copy sheet is inverted by an inversion device 151 before the sheet is accommodated in the tray 50, an image is copied on the back surface of the copy sheet. The guiding rollers and the carrying belt 47 are driven by a main motor 410.

Figure 2:
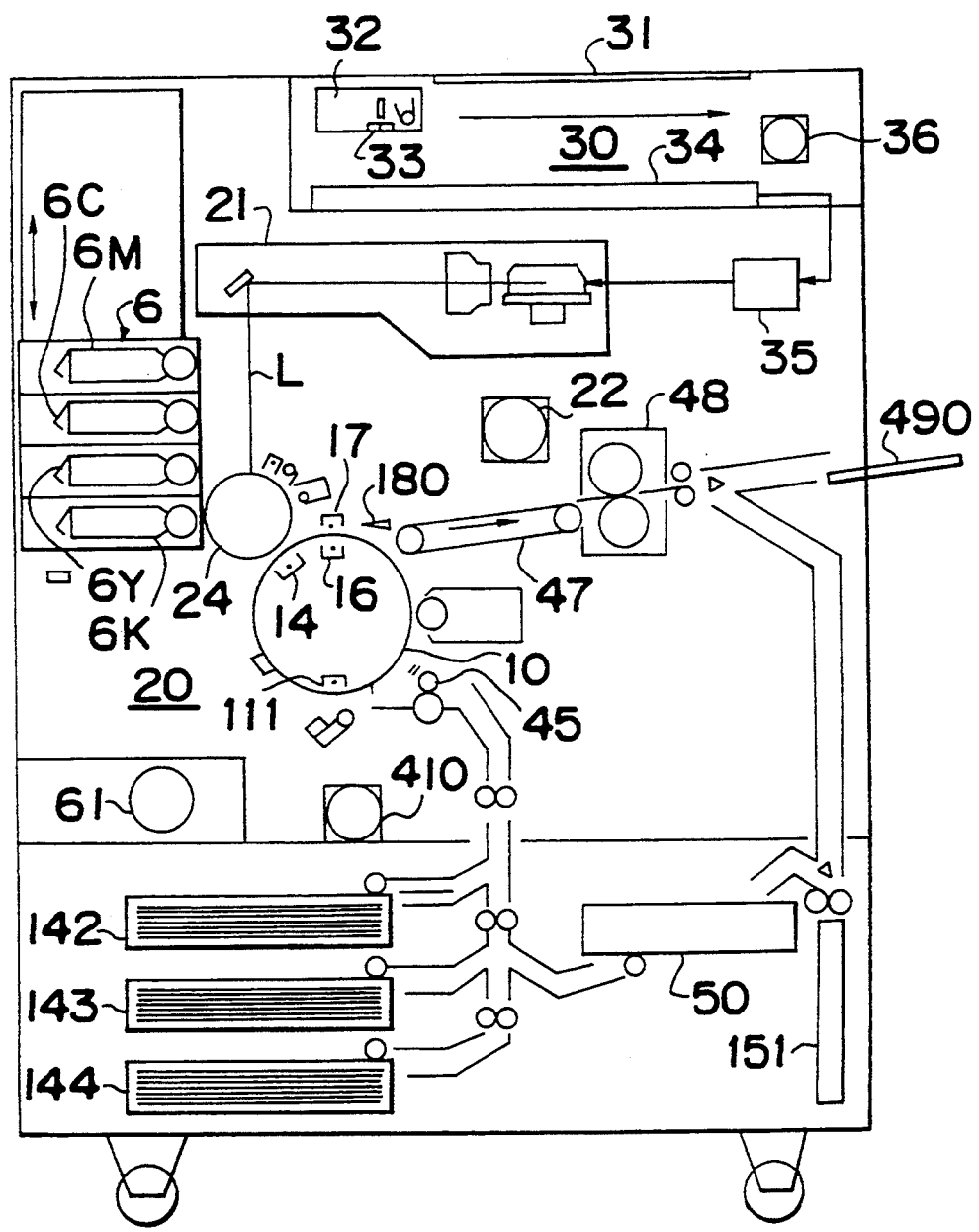
FIG. 2 is an illustrative view showing the mechanism of each copying apparatus shown in FIG. 1.
Figure 5:
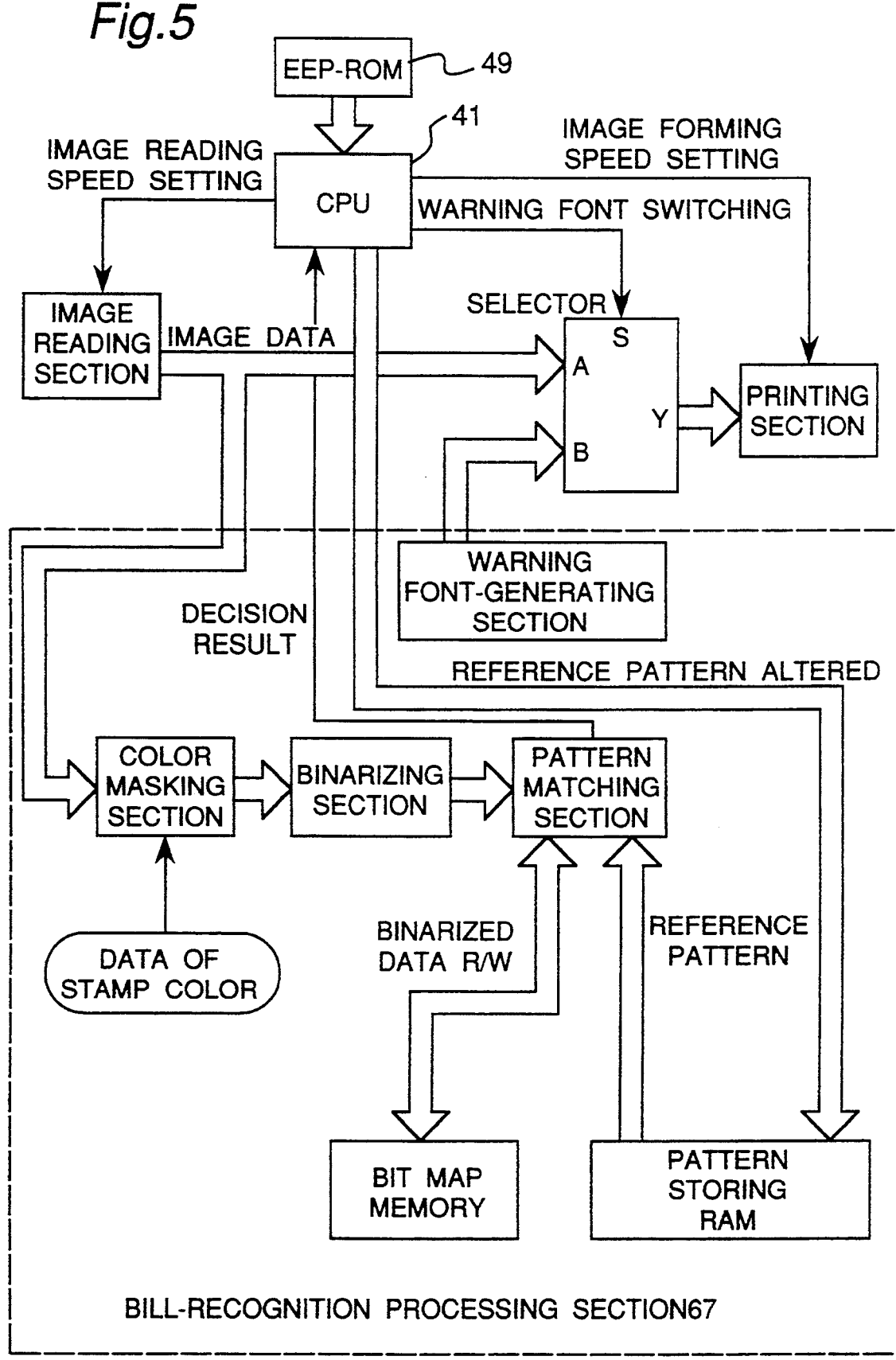
FIG. 5 is a block diagram showing the process, carried out by the copying apparatus, of deciding whether or not the document to be copied out is a bill.
Figure 6:
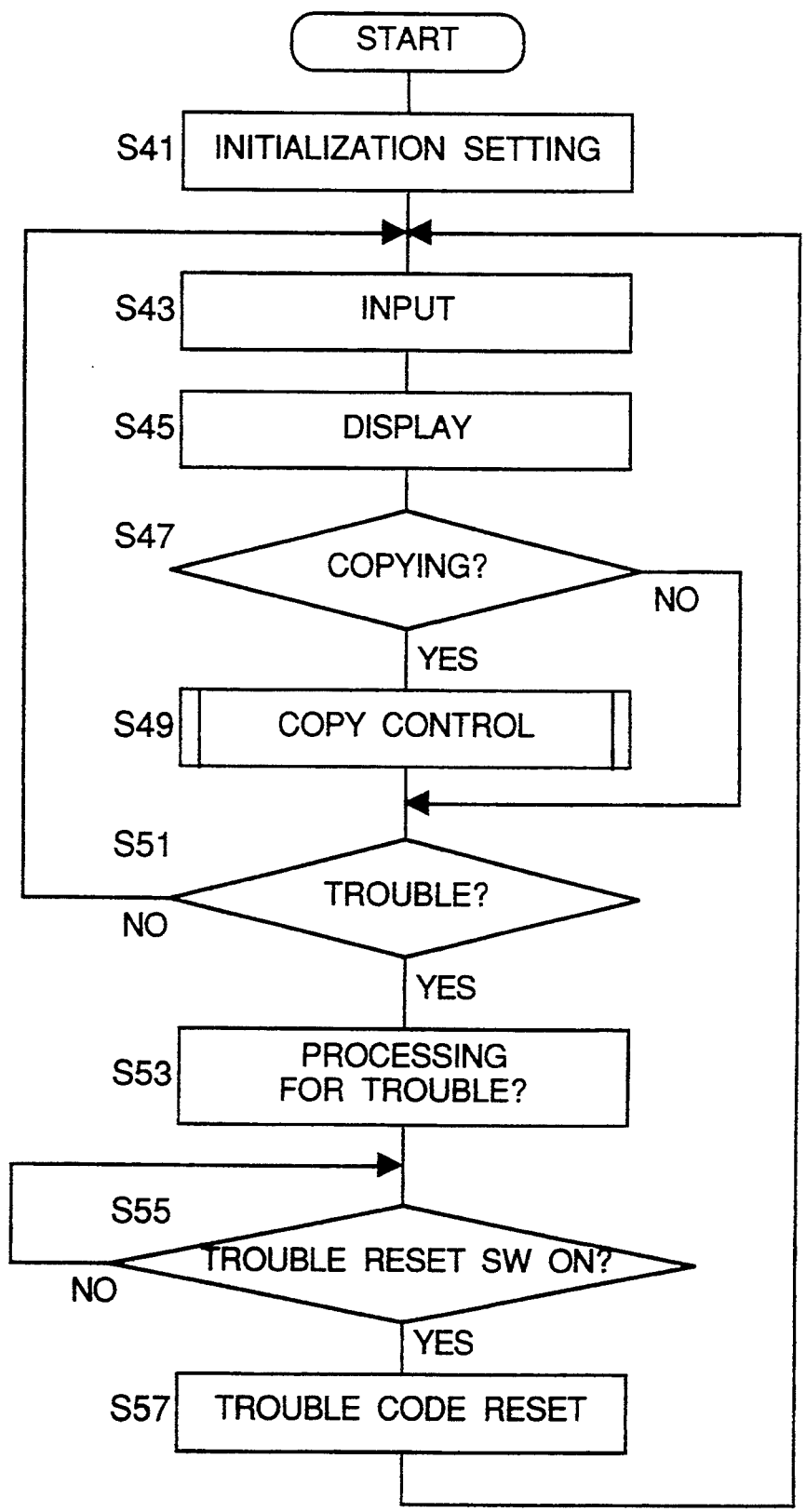
FIG. 6 is a flowchart showing the processing executed by a CPU of the copying apparatus.
Figure 7:
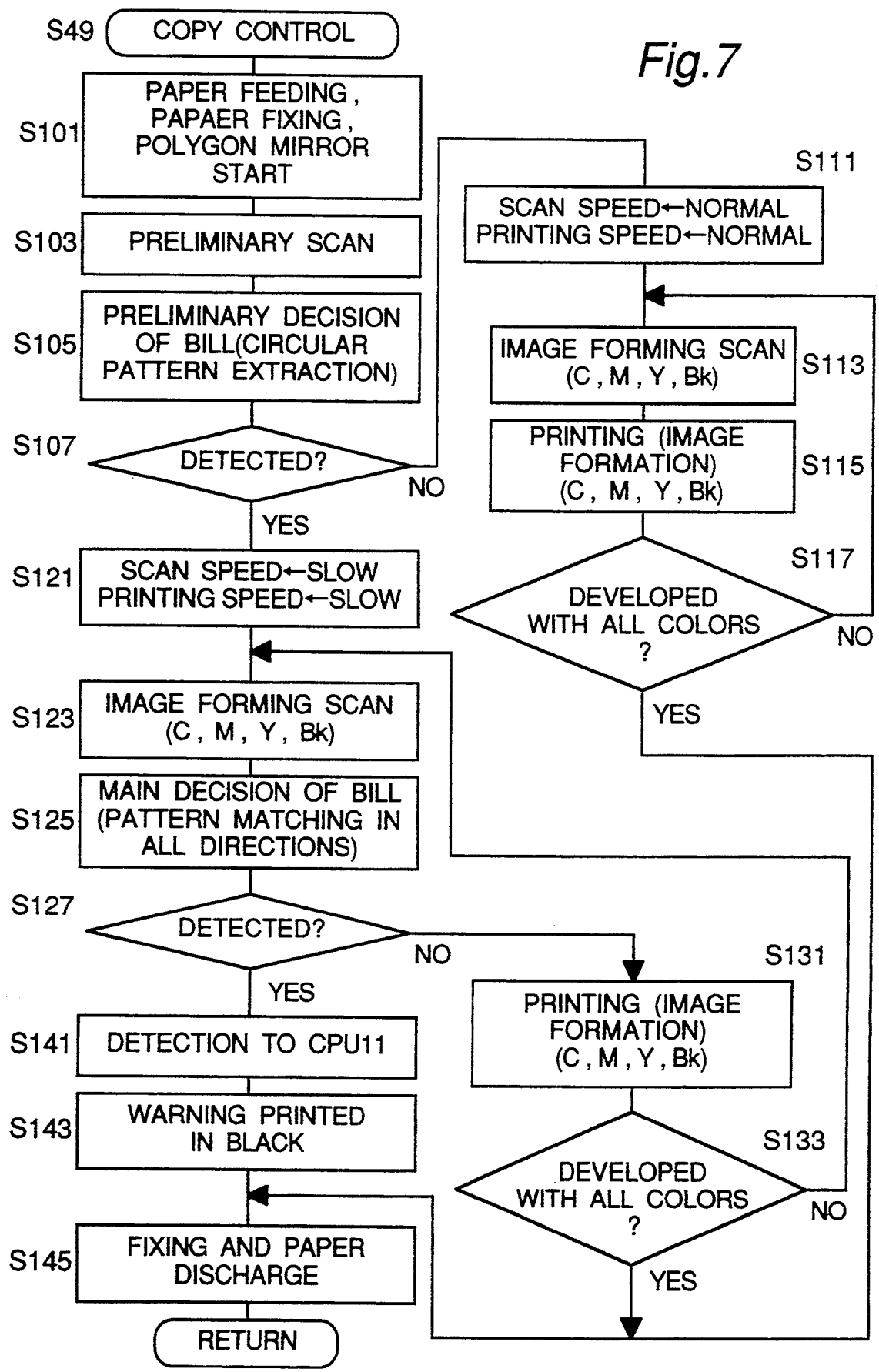
FIG. 7 is a detailed flowchart showing a copy control processing shown in FIG. 6.

(3) Bill-detecting method used by the copying apparatus
(3-1) Outline of bill-detecting method The outline of bill-detecting method of the copying apparatus is described below with reference to FIGS. 2, 5 and 7 showing the outline of copy control processing (step S49) which is one of the processings (see FIG. 6) to be executed by the CPU 41. The CPU 41 gives instructions to the image reading section 30 and the printing section 20 of the copying apparatus 4 (see FIG. 3).

In copy control processing (step S49), at step S101, the CPU 41 gives an instruction that a copy sheet should be fed out from one of the paper trays 142–144 and tightly wound around the transfer drum 10, and that a polygon mirror disposed inside the laser device 21 should start rotating.

At step S103, the CPU 41 gives an instruction to the image reading section 30 that a preliminary scan for detecting the size of an original document and the kind thereof should be carried out.

At step S105, based on image data read by the preliminary scan, a preliminary decision is made to decide whether or not the original document has a copy-prohibited image regardless of whether the original document is a bill, a check, valuable securities or a credit voucher. The detail of the preliminary scan is described later.

If it is decided at step 107 that there is no possibility that the image of the original document is a copy-prohibited one, the CPU 41 gives an instruction that a normal copying operation should be performed. That is, at step S111, the CPU 41 gives an instruction both to the image reading section 30 and to the printing section 20 that image reading speed and printing speed should be adjusted to a normal speed.

At step S113, the CPU 41 gives an instruction to the image reading section 30 to read an image for cyan toner, and at step S115, the CPU 41 gives an instruction to the printing section 20 to form the image by the cyan toner. If it is decided at step S117 that the operation of reading and forming the image with respect to the cyan toner is completed, the same procedure from the step 111 to 117 is repeated for magenta, yellow and black toner successively.

When it is decided at step S117 that all the operations of reading and forming the images with respect to all the toners are completed, at step S145, the copy sheet is removed from the transfer drum 10 and image-fixing operation to the copy sheet is performed by the fixing device 48, and then the copy sheet is discharged to the discharge tray 490.

If it is decided at step S107 that there is a possibility that the image of the original document is a copy-prohibited one, the CPU 41 gives an instruction that copying operation should be performed at a lower speed than usual, and a main decision to analyze more in detail whether or not the bill is real is executed.

That is, at step S121, the CPU 41 gives an instruction both to the image reading section 30 and to the printing section 20 that image reading speed and printing speed should be adjusted to a lower speed than usual.

At step S123, the CPU 41 gives an instruction to the image reading section 30 to read an image to be developed with cyan toner. At step 125, the main decision is executed based on image data read. The detail of the main decision is described later. If it is decided at step S127 that the original document is not a bill, the electrostatic latent image formed based on the image data is developed with the cyan toner and the toner image is transferred to the copy sheet at step S131.

If it is decided at step S133 that an image formation with the cyan toner is completed, the CPU 41 gives an instruction to the image reading section 30 to read an image to be developed with the magenta toner. If it is decided at step S127 that the original document is not a bill, the electrostatic latent image formed based on the image data is developed with the magenta toner and the toner image is transferred to the copy sheet at step S131. Thereafter, similar operations are performed by using the yellow toner and the black toner.

If it is decided at step S133 that the electrostatic latent images formed based on the image data are developed with the cyan toner, the magenta toner, the yellow toner, and the black toner, and those toner images are transferred to the copy sheet, the copy sheet is removed from the transfer drum 10 and the toner images are fixed to the copy sheet by the fixing device 48, and then the copy sheet is discharged to the discharge tray 490 at step S145.

If it is decided at step S127 that the original document is a bill, a signal indicating the decision is transmitted to the CPU 11 at step S141. Upon reception of the signal, the CPU 11 of the data terminal DT1 executes processing to transmit data indicating the decision to the service center as will be described later.

The copying operation is then canceled and a character of "invalid" is printed in black color. That is, not the image of the original document read at step S123, but an electrostatic latent image based on font data indicating, for example, a character of "invalid" outputted from a warning font-generating section is formed on the surface of the photosensitive drum 24. The electrostatic latent image of "invalid" is developed with the black toner and transferred to the copy sheet at step S143.

This operation can be accomplished by the switching of a selector, as shown in FIG. 5, by an instruction outputted from the CPU 41.

(3-2) Detail of preliminary and main decisions

Figure 8:
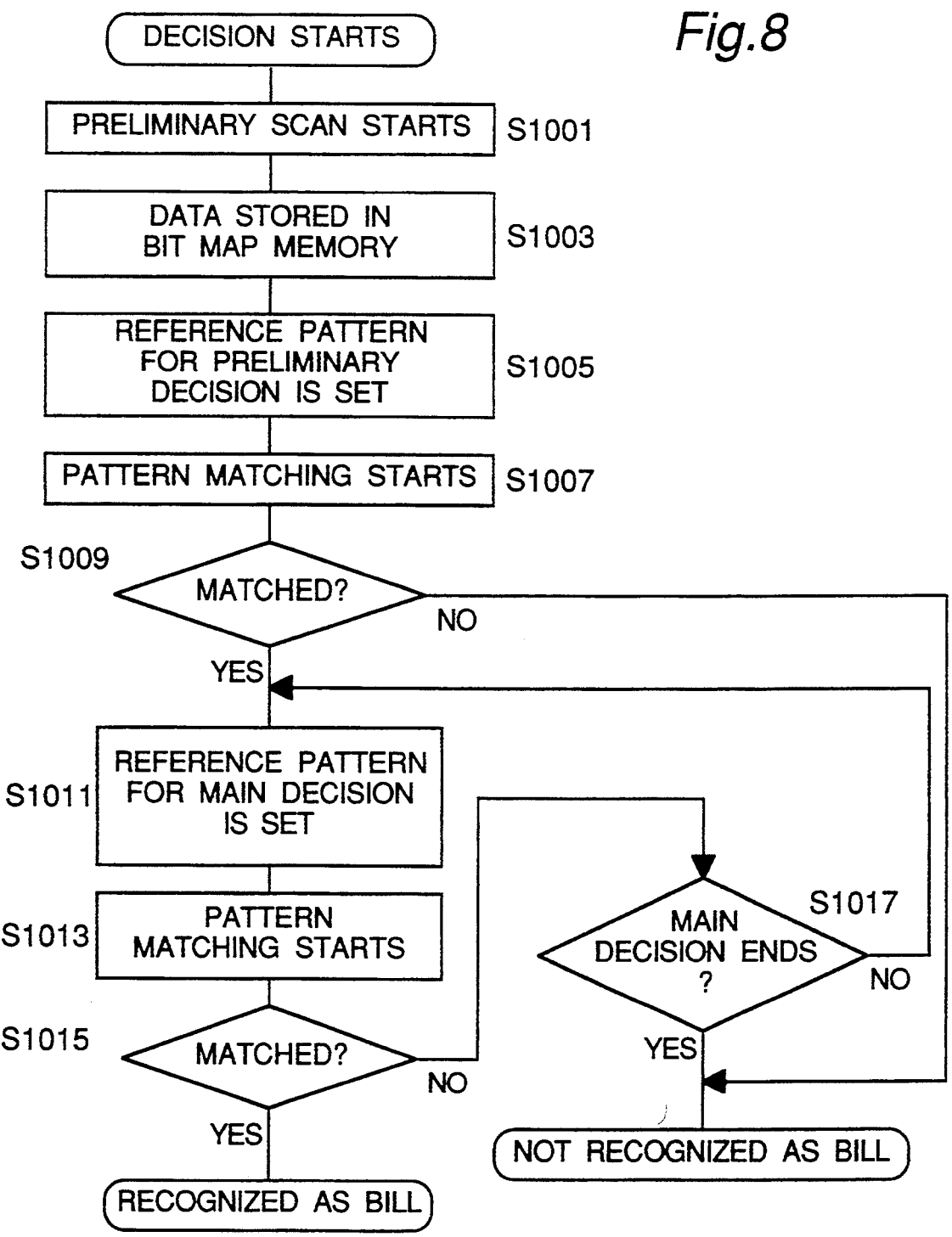
FIG. 8 is a flowchart showing an outline of a processing to decide whether or not the document to be copied out by the copying apparatus is a bill.

The detail of preliminary and main decisions is described below with reference to FIGS. 5, 9, and 10 in addition to FIG. 8 showing the procedure of preliminary and main decisions.

Figure 9:
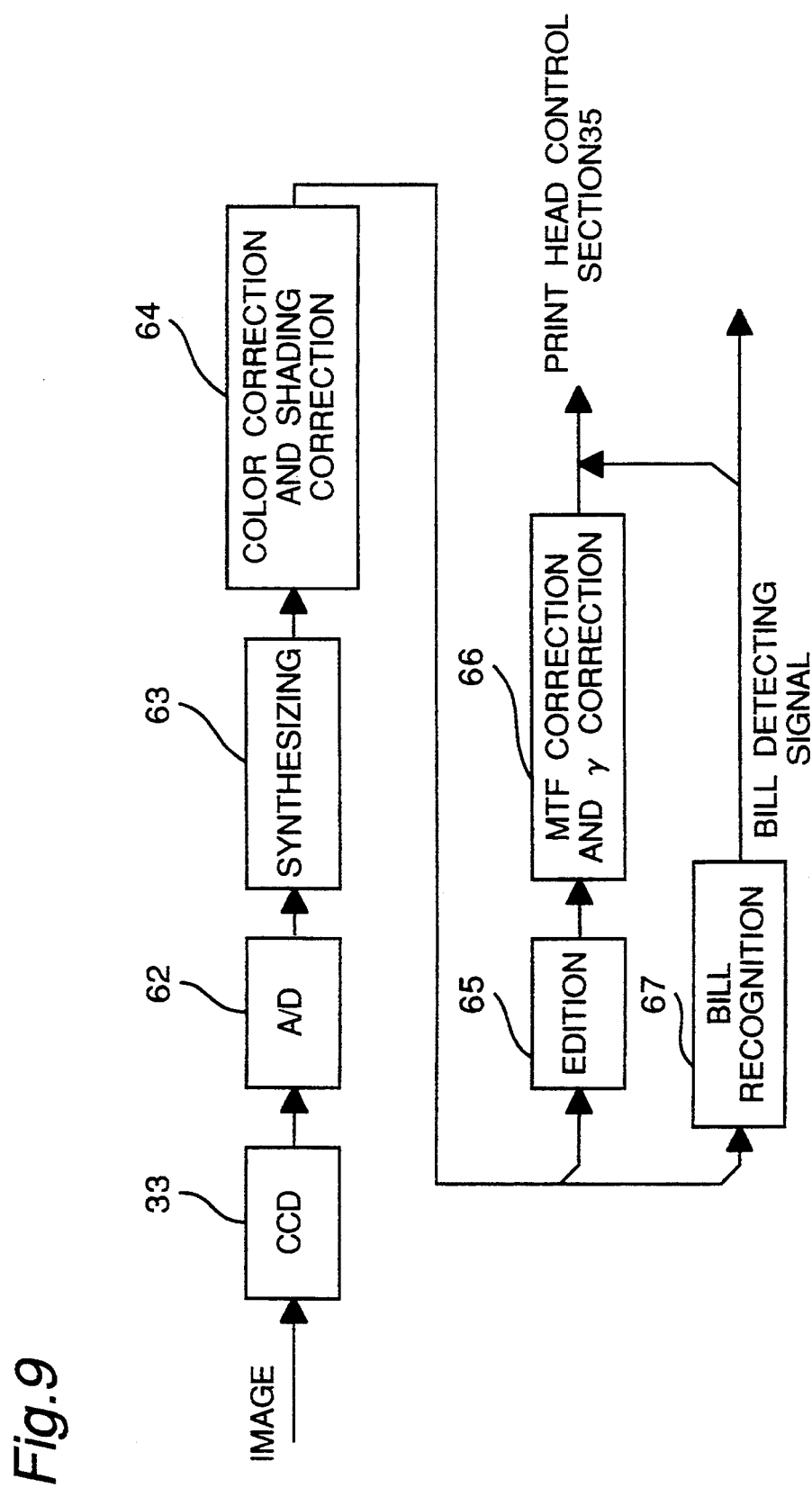
FIG. 9 is a block diagram showing an image-reading processing executed by the copying apparatus.

When a preliminary scan is started in the image reading section 30 at step S1001, as shown in FIG. 9, an optical image is converted into an electrical signal by a CCD image sensor 33 (having five sensors). The electrical signal is converted into digital data by an A/D converter 62, and then the digital data is synthesized into color data of red, green, and blue by a synthesizing section 63. Then, in a block 64, color and shading corrections of the color data are carried out.

Then, image data is sent to an edition processing section 65 and then to a block 66 so that MTF correction and γ correction of the image data are made. Thereafter, the processed image data is sent to the print head control section 35 of the printing section 20. At this time, a bill recognition processing section 67 transmits a bill recognition signal to the CPU 41. When the CPU 41 gives an instruction to the selector shown in FIG. 5 to switch upon reception of the bill recognition signal, font data indicating "invalid" is transmitted from the warning font-generating section to the print head control section 35, as performed at step S143.

The image data corrected in the block 64 is also sent to the bill recognition processing section 67 to execute the preliminary and main decisions.

Upon reception of the image data, at the bill recognition processing section 67, only a particular color, for example, the color of a stamp on the bill, is extracted from the image data by a color masking portion, and the data of the extracted color is binarized by a binarizing portion, and then the binarized data is stored in a bit map memory at step S1003.

Reference image data used in the preliminary decision, for example, a circular pattern (see FIG. 10) of a stamp on a bill stored in the EEP-ROM 49 is transferred to a pattern-storing RAM at step S1005.

The image data sent to the bill recognition processing section 67 is compared with the reference image data in a pattern-matching portion (preliminary decision). The result of the comparison as to decide whether or not the former is coincident with the latter is transmitted to the CPU 41 at step S1007.

If it is decided at step S1009 that the former is not coincident with the latter, it is decided that the original document is not a bill. In this case, a normal copying operation is carried out. That is, the CPU 41 gives instructions to the image reading section 30 and the printing section 20 that image reading speed and printing speed should be adjusted to a normal speed, respectively (step S111 in FIG. 7).

If it is decided at step S1009 that the former is coincident with the latter, there is a possibility that the original document is a bill. Therefore, the main decision is made.

First, the CPU 41 gives instructions to the image reading section 30 and the printing section 20 that image reading speed and printing speed should be adjusted to a lower speed than usual, respectively (step S121 in FIG. 7).

That is, by setting the image reading speed and the printing speed in this way, the main decision can be completed before the electrostatic latent image is developed with the black toner used last of all color toners, and it is possible to perform necessary processing, namely to write a character of "invalid" on the copy sheet when the original document has a copy-prohibited image (see step S143 in FIG. 7).

When the main scan starts, the image data read is processed similarly to the case of the preliminary decision and the processed image data is stored in the bit map memory.

A plurality of reference image data for use in the main decision stored in the EEP-ROM 49 is sequentially transferred to the pattern-storing RAM at step S1011 so that the image data (for example, of patterns of a stamp on a bill) stored in the bit map memory is sequentially compared with each of the reference image data at step S1013. As shown in FIG. 10, eight patterns P1-P8 as reference patterns are stored in the EEP-ROM 49. The eight patterns are identical to each other but inclinations are different from each other.

Pattern matchings between the two data are carried out one after another by using these patterns in different inclinations.

If the main decision is completed at step S1017 without the pattern stored in the bit map memory coinciding with any one of the reference patterns P1-P8 at step S1015, it is decided that the original document is not a bill. In this case, processing of writing the character of "invalid" on the copy sheet (see step S143 of FIG. 7) is not executed.

If it is decided at step S1015 that the pattern stored in the bit map memory coincides with any one of the reference patterns P1-P8, the original document is recognized as a bill, and bill recognition signal is transmitted to the CPU 41. Then, the selector is switched to execute the processing of writing the character of "invalid" on the copy sheet.

Instead of pattern matching, other methods such as using magnetism, color histogram, spatial frequency pattern or configuration-recognition can be used.

(4) Data communication between the copying apparatus, and its controller in the service center Data communication between the user and the service center is described below with reference to FIG. 6 (showing the main routine of the processing executed by the CPU 41 of the copying apparatus 4), FIGS. 11 through 16 (showing the processing executed by the CPU 11 of the data terminal DT1), and FIGS. 17 through 20 (showing the processing executed by the CPU 91 on the side of the service center).

(4-1) Processing executed by CPU 41 of copying apparatus 4

As shown in FIG. 6, the CPU 41 starts processing when the power supply is turned on, and initialization such as clearance of memory and setting of standard mode are performed at step S41. Then, steps after step 43 are repeatedly executed as a loop processing.

At step S43, inputted signals of various kinds are processed. The CPU 41 receives signals from the key switches disposed on the operation panel 40, sensors installed inside the copying apparatus 4, and the CPU 11 of the data terminal DT1. At step S45, displays are made on the operation panel 40.

If it is decided at step S47 that copying operation is being performed, various processings necessary for copying operation are sequentially executed at step S49 as described previously with reference to FIG. 7.

If it is decided that the original document is a bill, the information of the decision is transmitted to the CPU 11 (see step S141 of FIG. 7) carrying out the copy control processing (at step S49). Upon reception of the information, the CPU 11 gives an instruction to set a bill detection transmission flag to "1" (see step S403 of FIG. 13.)

If it is decided at step S51 that a trouble such as jam, exposure lamp failure, heater failure or abnormal discharge of charge wire has occurred, processing corresponding to the trouble is executed, and a signal indicating the trouble is transmitted to the CPU 11 at step S53. Upon reception of the signal, the CPU 11 gives an instruction to set a trouble transmission flag to "1" (see step S25 of FIG. 11.) When a trouble reset switch is operated by a service man repairing the trouble at step S55, a trouble reset signal is transmitted to the CPU 11 at step S57.

(4–2) Processing executed by CPU 11 of data terminal DT1

Figure 11:
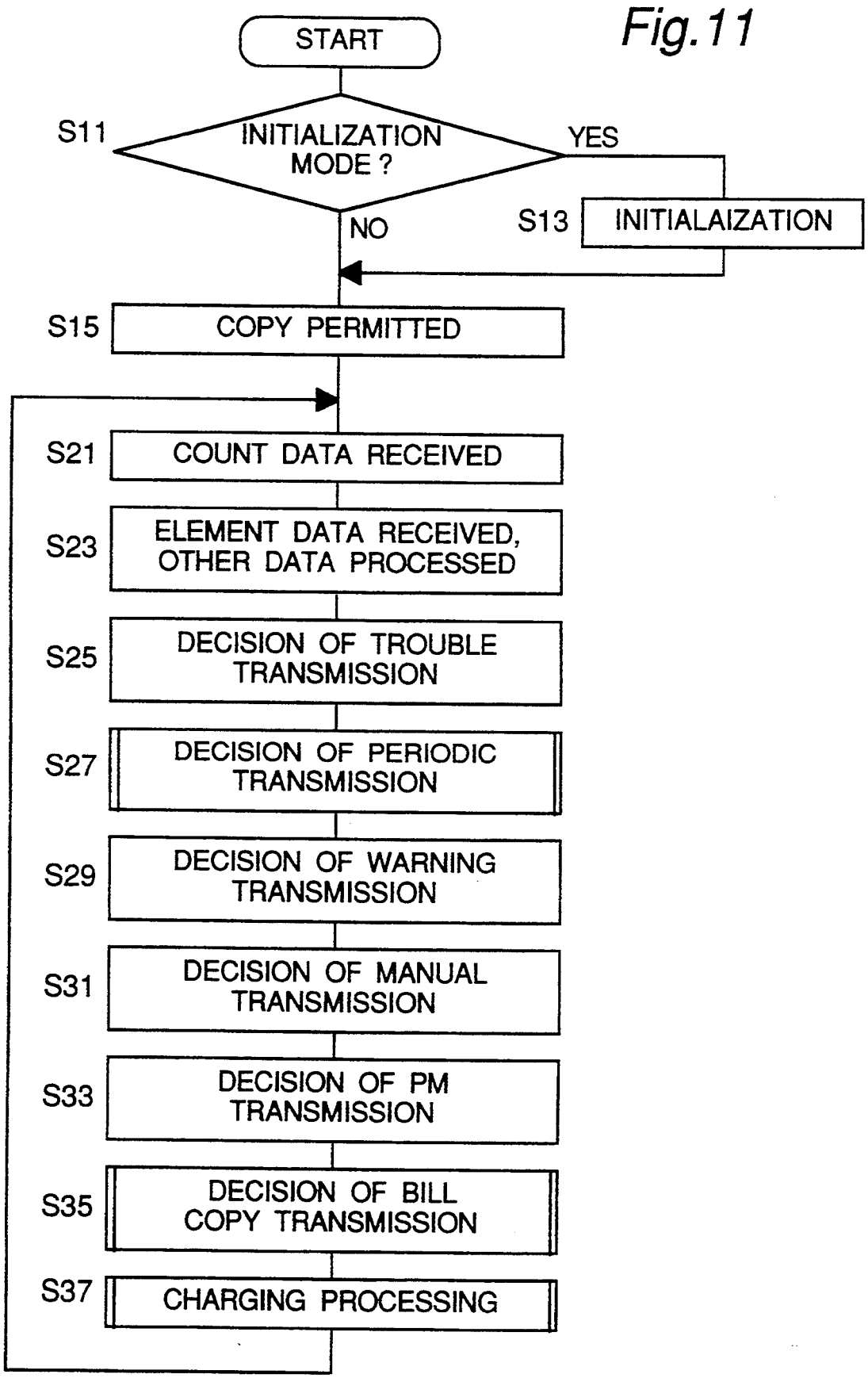
FIG. 11 is a flowchart showing a processing executed by a CPU of a data terminal connected with the copying apparatus.
Figure 12:
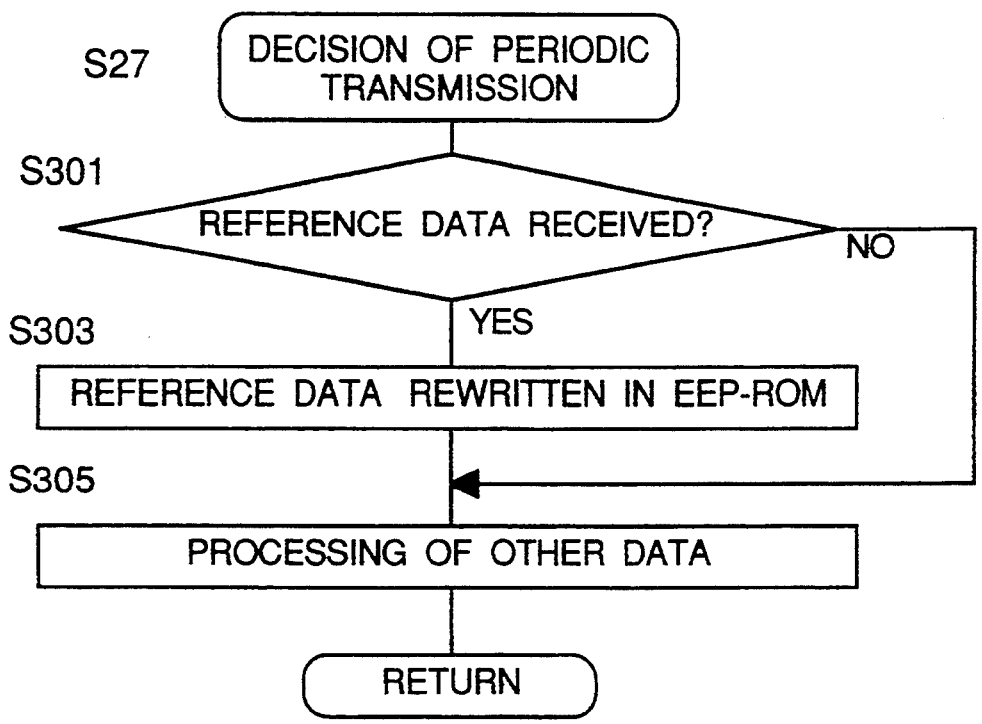
FIG. 12 is a flowchart showing a processing of periodic transmission shown in FIG. 11.

As shown in FIG. 11, the CPU 11 starts processing when the power supply is turned on. If it is decided at step S11 that initialization mode has been set, initialization processing is executed at step S13, and a copy permission signal is transmitted to the CPU 41 at step S15. If it is decided at step S11 that initialization mode has not been set, the copy permission signal is immediately transmitted to the CPU 41 at step S15. Thereafter, the steps S21 through S37 are repeatedly executed as a loop processing.

Initialization mode setting processing at step S13

Initialization mode setting is executed when a dip switch SW4 (see FIG. 3) is turned on, i.e., when initialization mode is set at step S11. In this processing, the CPU 11 receives the selection number (telephone number) of the service center, ID number (DTID) of the data terminal DT1, and the ID number (center ID) of the service center according to ON and OFF of dip switches DIPSW1–DIPSW3 (see FIG. 3), and data of the initialization mode setting is sent out.

Count data reception processing at step S21

In this processing, the CPU 11 processes various types of count data transmitted from the CPU 41. The contents of data are discharge code of copy sheets, jam/trouble code, jam/trouble count value, count value of copy sheet per each size (per each paper supply opening), and PM count value. The CPU 11 stores the data by updating each data to the newest value.

Reception of element data and data processing at step S23

The CPU 11 receives the above mentioned element data sequentially. Data of the average value of element data and data corresponding to the standard deviation thereof are calculated and updated to the newest value.

Trouble transmission deciding processing at step S25

Upon reception of a signal indicating the occurrence of a trouble or the recovery of the trouble from the CPU 41, a trouble transmission flag or a trouble recovery transmission flag is set to "1". As a result, the modem 52 is actuated in charging processing (step S37) and connected with the service center through the communication line.

Periodic transmission deciding processing at step S27

At a predetermined, periodic transmission time, a periodic transmission flag is set to "1". As a result, the modem 52 is actuated in charging processing at step S37 and it is connected with the service center through the communication line. (see step S305 of FIG. 12). When reference data of a bill or the like is transmitted from the service center during communication with it (YES, at step S301 of FIG. 12), the CPU 11 transmits an instruction to the CPU 41 that the content of the EEP-ROM 49 should be rewritten at step S303. On reception of the instruction, the CPU 41 updates the data.

Warning transmission deciding processing at step S29

In this processing, the element data, the count value of a jam counter, and the count value of a PM counter are compared with each threshold.

If data get out of a permissible range or data returns to the permissible range, a warning transmission flag or a warning recovery transmission flag is set to "1". Consequently, the modem 52 is actuated in the charging processing (step S37) and it is connected with the service center through the communication line.

Manual transmission deciding processing at step S31

Upon pressing a push switch, a manual transmission flag is set to "1". As a result, the modem 52 is actuated in the charging processing (step S37) and it is connected with the service center through the communication line.

PM transmission deciding processing at step S33

When the count value of the PM counter is cleared to "0" as a result of replacing parts, a previous count value is substituted into a current count value as a clearance value, and then, a PM transmission flag is set to "1". Consequently, the modem 52 is actuated in the charging processing (step S37) and it is connected with the service center through the communication line.

Bill copy transmission deciding processing at step S35

Figure 13:
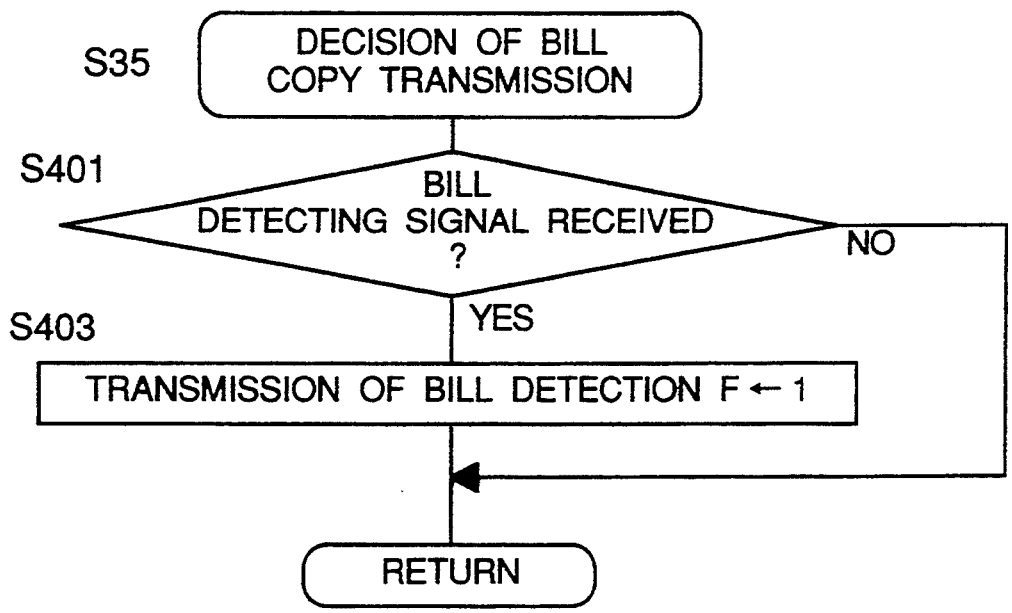
FIG. 13 is a flowchart showing a processing of bill detection transmission shown in FIG. 11.

Upon reception of a signal indicating that the original document is a bill from the CPU 41 of the copying apparatus 4 (see step S401 of FIG. 13 and step S141 of FIG. 7), a bill detection transmission flag is set to "1" (step S403 of FIG. 13). Consequently, the modem 52 is actuated in the charging processing (step S37) and it is connected with the service center through the communication line.

Charging processing at step S37

When any one of the above-described transmission flags is set to "1", the CPU 11 gives an instruction, to the modem 52, indicating that the modem 72 of the service center should be called. After the modem 52 is connected with the modem 72, data communication corresponding to the transmission flag is executed between the user and the service center.

Figure 14:
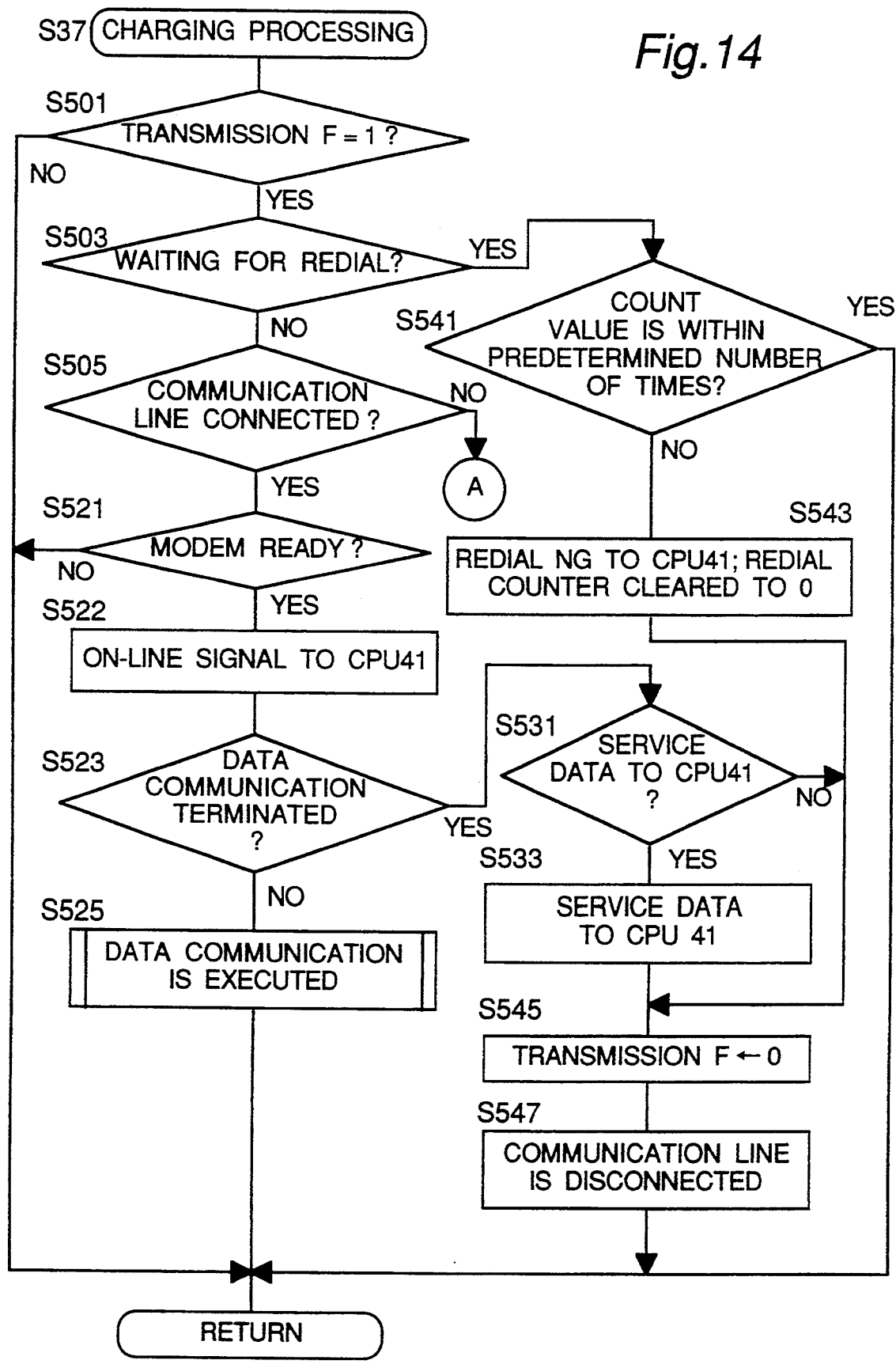
FIG. 14 is a flowchart showing a part of charging processing shown in FIG. 11.
Figure 15:
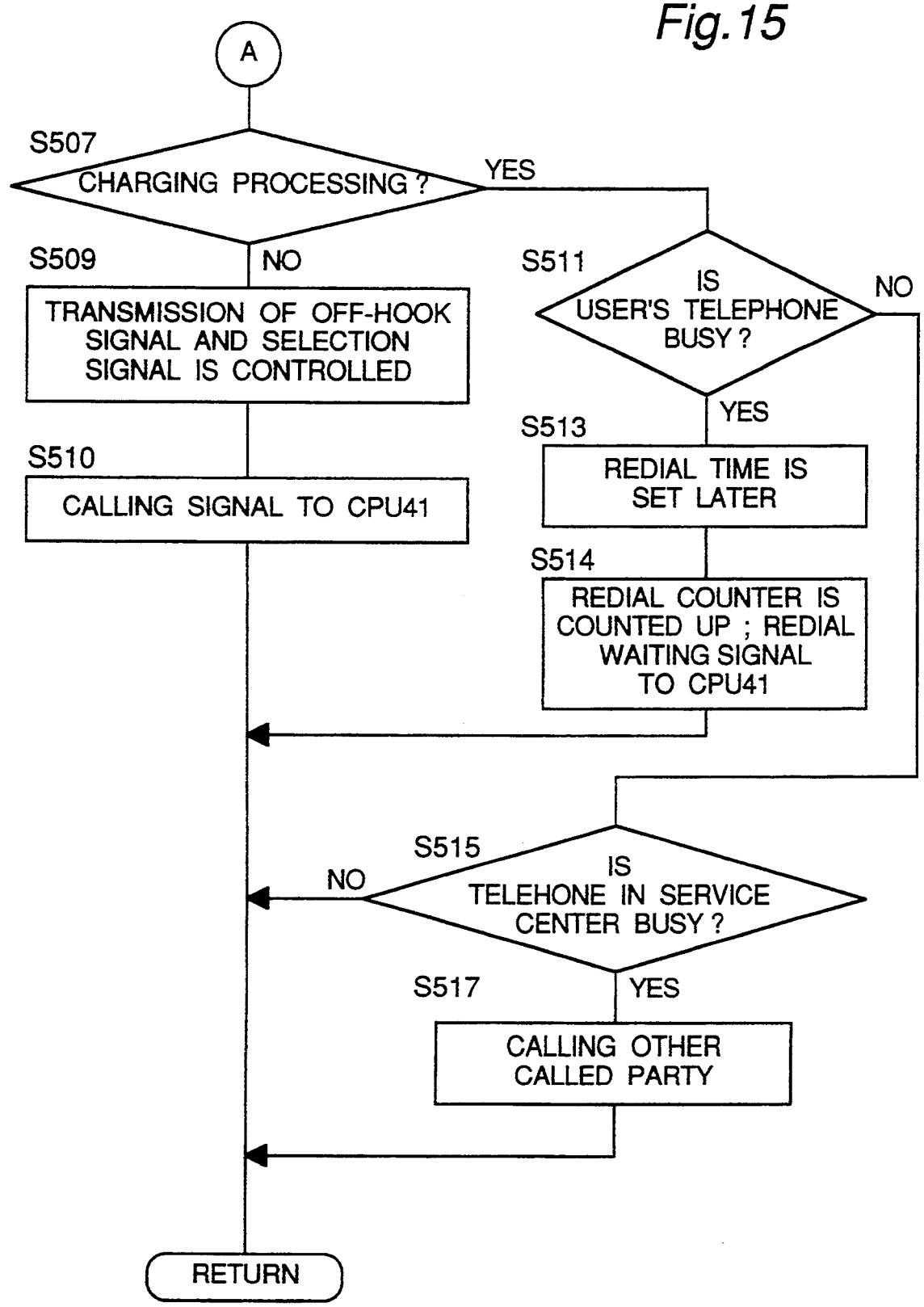
FIG. 15 is a flowchart showing the remaining part of the charging processing shown in FIG. 11.

The detail of the charging processing is described below with reference to FIGS. 14 and 15.

If any one of the transmission flags is set to "1" (YES, at step S501), the CPU 11 gives an instruction to the modem 52 at step S509 so that the modem 52 transmits an off-hook signal, an outline selection signal, and the telephone number of the modem 72 to the service center if the telephone number of the service center is not redialed (no, at step S503); if the modem 52 is not connected with the modem 72 of the service center (no, at step S505); and if the CPU 11 is not waiting for the connection between the user and the service center after the CPU 11 gave an instruction to the modem 52 to call the modem 72 (no, at step S507). That is, the CPU 11 gives an instruction to the modem 52 to call the modem 72. In addition, the CPU 11 transmits information, to the CPU 41, indicating that the CPU 11 has given the calling instruction.

If it is decided at step S511 that the telephone 53 connected with the modem 52 is busy and hence the modem 72 cannot be called as a result of the processing at step S509, a time later than the time when the service center has been called is set as a redial time at step S513. When a redial counter is counted up, the CPU 11 transmits information, to the CPU 41, that the telephone number of the service center is redialed at step S514. Therefore, the decision to be made at step S503 is kept YES until the redialing time comes. Therefore, the processing is not executed at step S509. At step S509, when the redialing time comes, the CPU 11 gives an instruction to the modem 52 to call the modem 72 of the service center.

If it is decided at step S515 that the modem 72 is busy as a result of transmitting a signal for calling the service center in correspondence with the processing at step S509, i.e., if the telephone 73 is busy or if the CPU 91 of the service center does not respond to the user when the modem 72 is connected, the CPU 11 gives an instruction to the modem 52 to call a subordinate called party next to the service center in priority at step S517. In this manner, the processing of step S509 is executed to the called party. An extension number of the private branch may be set as a number of the called party next to the service center in priority.

If it is decided at step S541 that the count value of the redial counter exceeds a predetermined value, an NG signal indicating disconnectiveness is transmitted to the CPU 41. Then, the count value of the redial counter is reset to "0" at step S543. The transmission flag is reset to "0" at step S545. Then, the communication line is disconnected at step S547.

If it is decided at step S505 that the communication between the user and the service center becomes possible as a result of the processing executed at step S509, a certain time elapses until a signal indicating that data transmission is possible is transmitted from the modem 72 to the modem 52. When it is decided at step S521 that transmittable state is entered, the CPU 11 transmits a signal, to the CPU 41, indicating that the user and the service center are on line at step S522. Then, at step S525, data communication can be carried out between the user and the service center.

A type of data communicated between the user and the service center is determined by a transmission flag.

Figure 16:
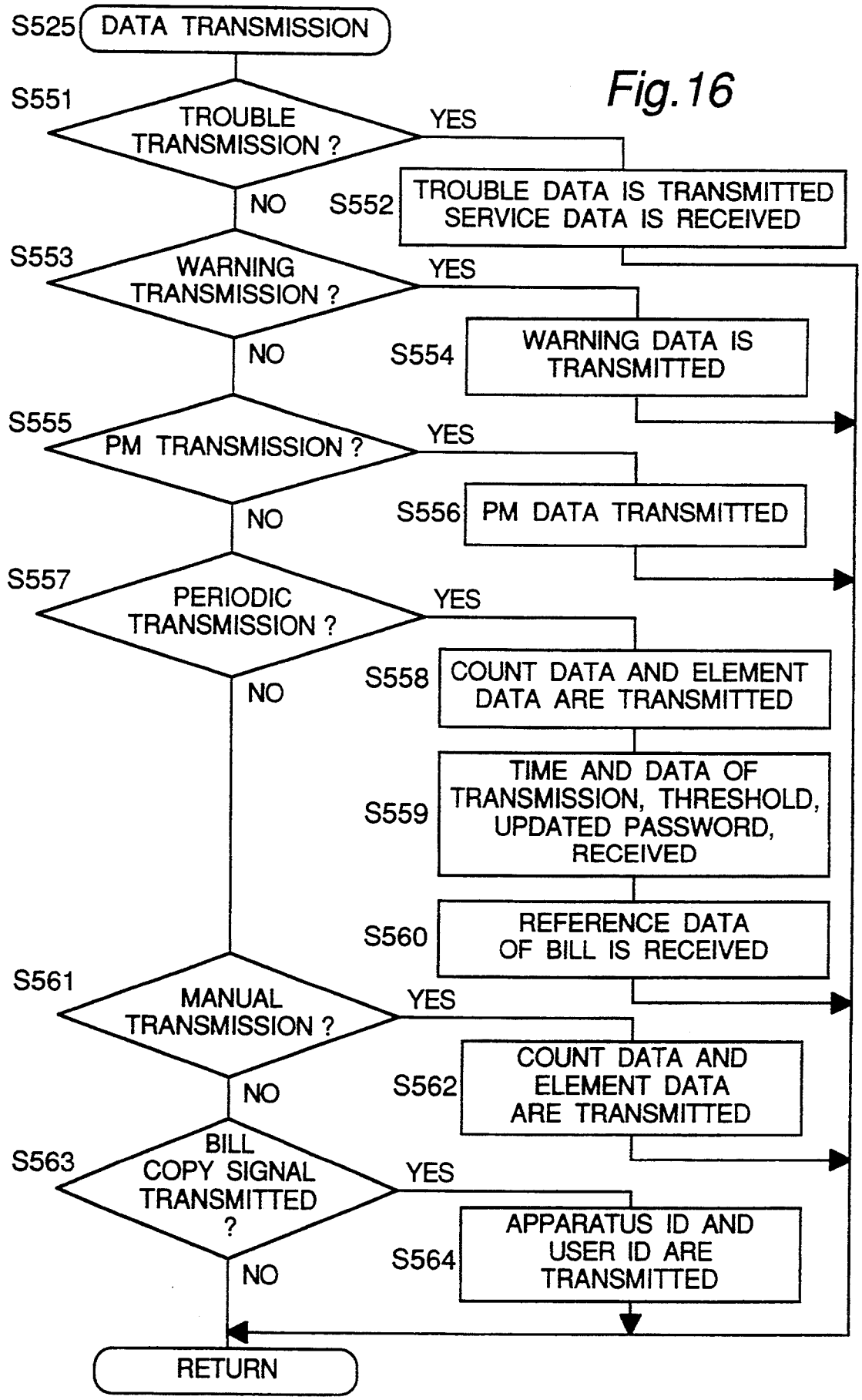
FIG. 16 is a flowchart showing a processing of data communication shown in FIG. 14.
Figure 20:
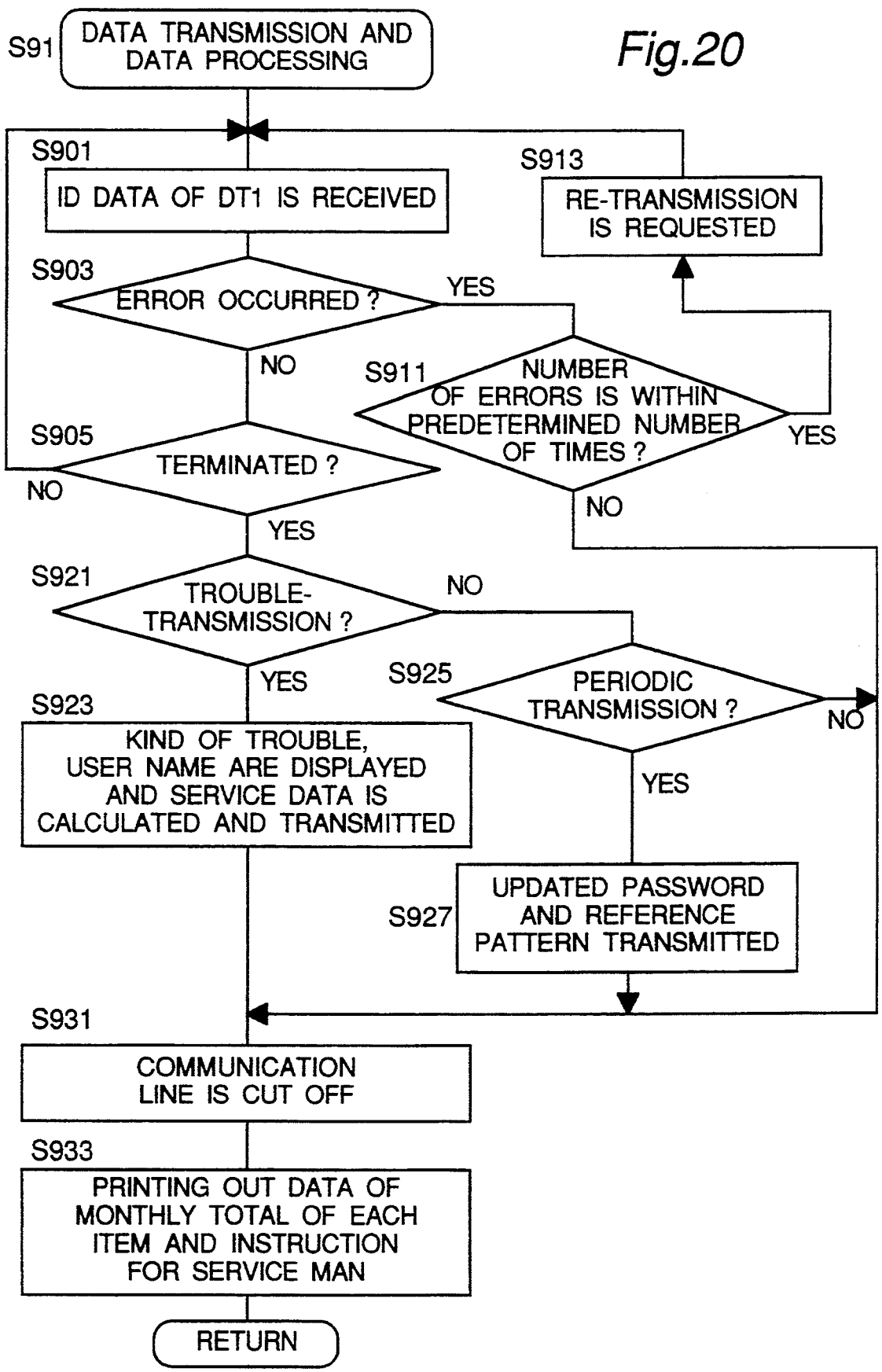
FIG. 20 is a flowchart showing a processing executed by the CPU of the controller.

That is, as shown in FIG. 16, if it is decided at step S551 that a trouble has occurred, after the trouble data indicating the kind of the trouble is transmitted to the service center, the CPU 11 receives service data (indicating, for example, a schedule on the arrival time of a service man and the like, see step S923 of FIG. 20) from the service center at step S552. If it is decided at step S553 that a warning has been given, the CPU 11 transmits warning data to the service center at step S554. If it is decided at step S555 that PM has been given, the CPU 11 transmits PM data to the service center at step S556.

In case of periodic transmission (YES, at step S557), various kinds of count and element data are transmitted from the service center to the CPU 11 at step S558, and the CPU 11 receives data of the day and hour of the next periodic transmission, updated threshold data, and an updated password from the service center at step S559. When reference data of a bill or the like is transmitted from the service center (see step S927 of FIG. 20), the CPU 11 receives the reference data at step S560. Based on the reference data thus received, the data of the EEP-ROM 49 is updated as described previously (see step S303 of FIG. 12).

In case of manual transmission (YES, at step S561), various kinds of count and element data are transmitted from the CPU 11 to the service center.

If it is decided at step S563 that the image of a bill has been copied, various kinds of data specifying illegal use is transmitted from the user to the service center at step S564, where one can take any necessary countermeasure. The data includes day and time, the number and model name of the copying apparatus in question, the identification data (ID) specifying the user name of the copying apparatus or the department installed with the apparatus, the kind of bill, and so on.

When it is decided at step S523 that the data communication between the user and the service center terminates, it is decided at step S531 whether or not service data indicating the arrival time of a service man has been transmitted from the service center to the user. If YES at step S531, the service data is transmitted to the CPU 41 of the copying apparatus 4 at step S533. Then, the transmission flag is reset to "0" at step S545 and the communication line between the user and the service center is cut off at step S547.

(4-3) Processing executed by CPU 91 of service center

Figure 17:
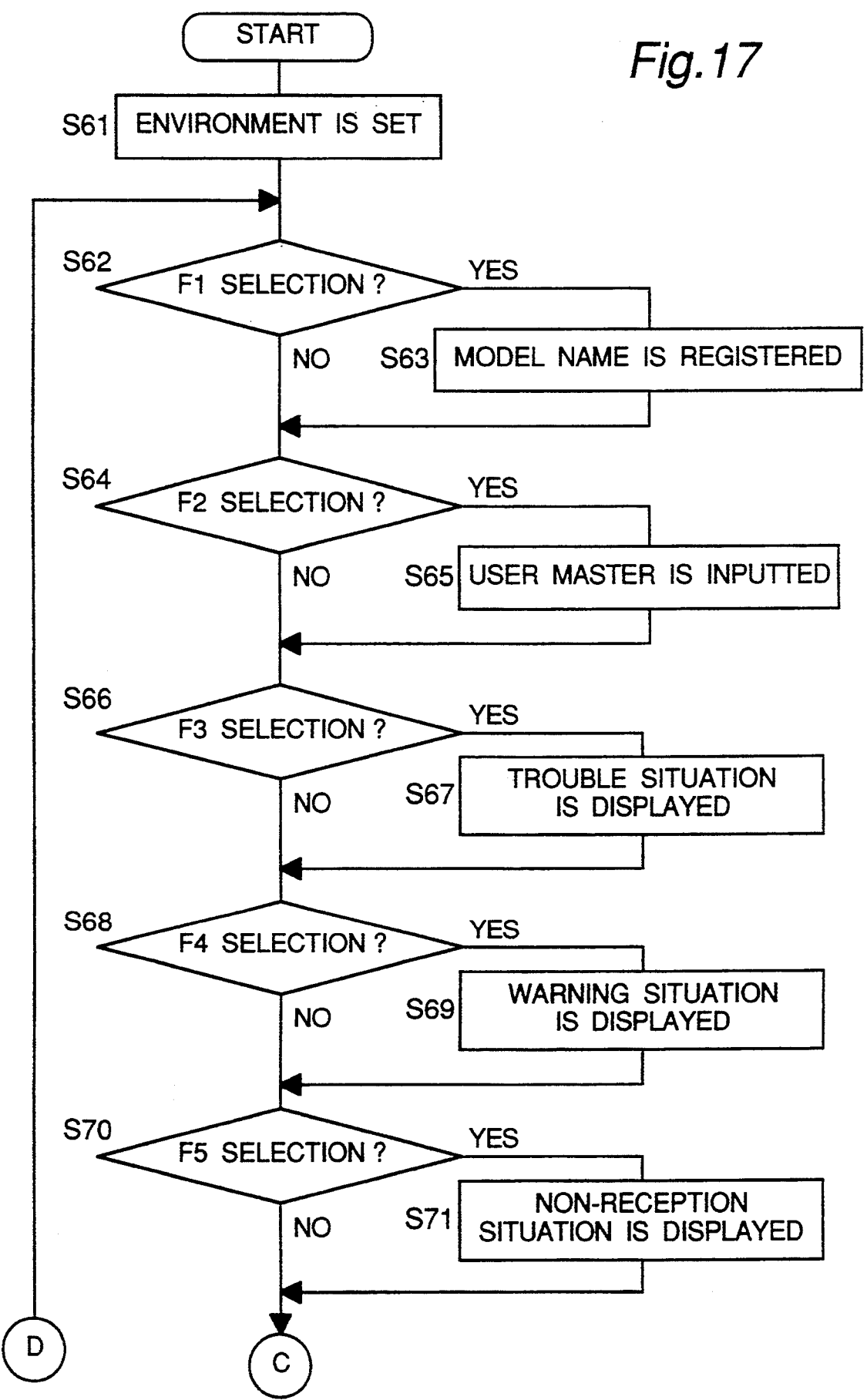
FIG. 17 is a flowchart showing a part of processing executed by a CPU installed in the controller shown in FIG. 1.
Figure 18:
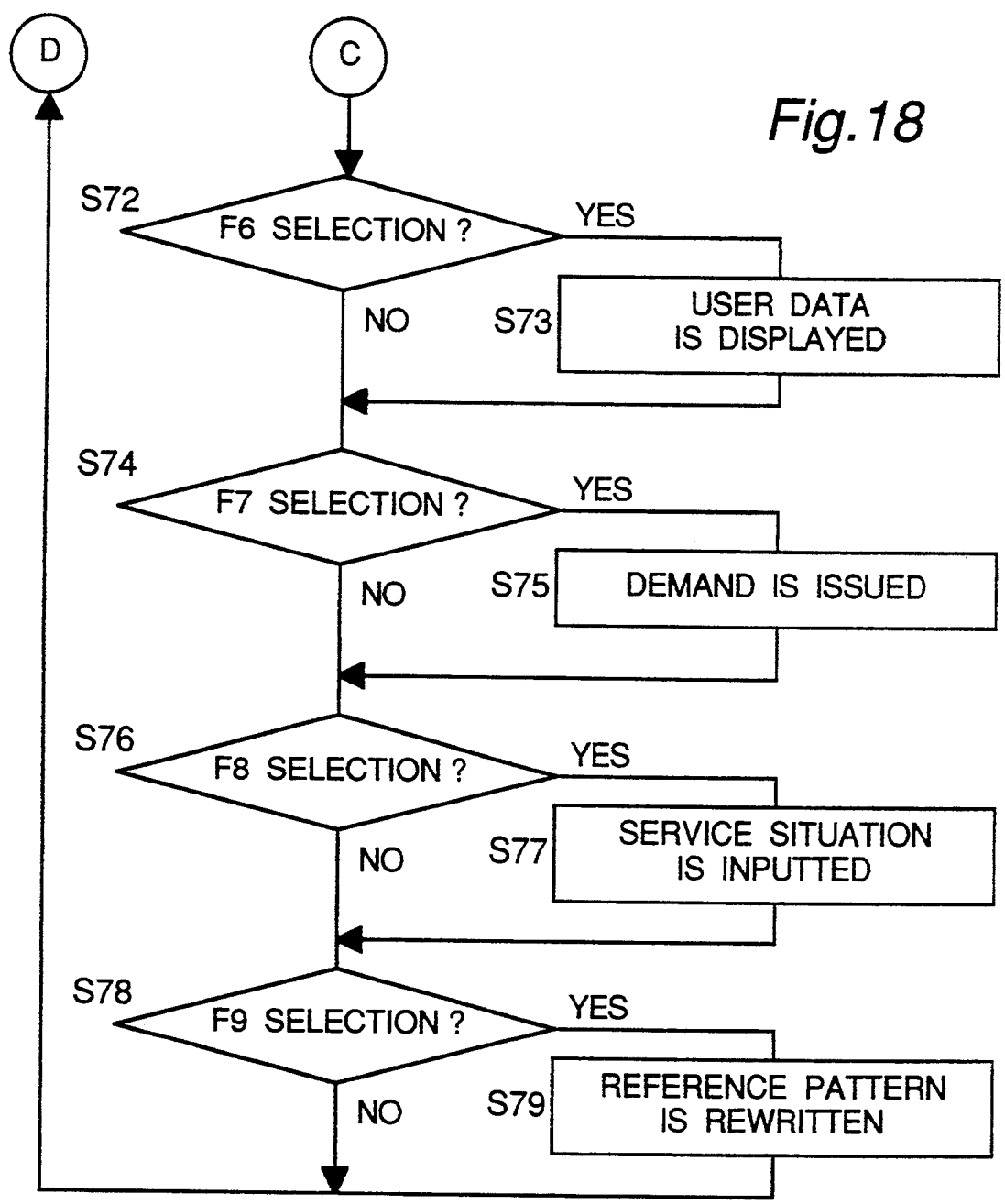
FIG. 18 is a flowchart showing the remaining part of the processing executed by the CPU installed in the controller shown in FIG. 1.

Referring to FIG. 17, when the power supply is turned on, the CPU 91 of the computer 90 of the service center starts processing and the environmental setting of modems, printers and so on are made at step S61. Processings executed when operating each of keys F1 through F9 of a key board 93 are described below.

Key operation of F1 key (YES at step S62)

At step S63, an acceptance mode of a model name registration of a copying apparatus is set. That is, the registration of the model name of the copying apparatus, the number of element data, the name of each element data, the threshold of each element data, the threshold of each count data etc. is accepted.

Key operation of F2 key (YES, at step S64)

At step S65, a registration acceptance mode of a user master is set. For example, the registration of the name, address, telephone number of a user, of the model name of a copying apparatus, and of the periodic transmission day and time is accepted per each copying apparatus. The identification data (ID) of each data terminal ID is automatically set.

Key operation of F3 key (YES, at step S66)

At step S67, a situation that some trouble has occurred is displayed. That is, user's information, transmitted from a user or users, such as user name, address, telephone number, the model name of a copying apparatus, day and time when the trouble of the copying apparatus occurred is displayed on the display screen 92 together with the content of the trouble. The number of troubles are always displayed on a corner of the display screen 92 regardless of operating the F3 key.

Key operation of F4 key (YES, step S68)

At step S69, a situation of warning is displayed. User's information of the copying apparatus from which warning transmission has been made, and the content of the warning are displayed on the display screen 92. The number of troubles are always displayed on a corner of the display screen 92 regardless of operating the F4 key.

Key operation of F5 key (YES, step S70)

At step S71, a situation that communication data has not yet been transmitted from the user's side is displayed. That is, user's information of the copying apparatus which has not yet transmitted data to the service center even though the time of the periodic transmission is over, is displayed on the display screen 92. The number of troubles is always displayed on a corner of the display screen 92 regardless of operating the F5 key.

Key operation of F6 key (YES, step S72)

At step S73, a display mode of user's data is shown. That is, when a particular user is selected, user information is displayed on the display screen 92. When a submenu is selected, the count value of each counter of each copying apparatus and element data on user's side is displayed monthly and/or with respect to each item. The counters include a total counter, a counter of copy sheet per each size, a jam counter, a trouble counter, and a PM counter.

Key operation of F7 key (YES, step S74)

At step S75, bills are printed out. The printer 94 is actuated to print out the claimed amount of money calculated on the basis of the count value of the total counter and of a predetermined calculating equations.

Key operation of F8 key (YES, step S76)

At step S77, a situation of service is inputted. That is, the data relating to the schedule of each service man, a situation of receipt (stock) of each component, and the making of service schedule is inputted. Based on the inputted data, the CPU 91 outputs data to manage the service schedule. The data is stored in RAM 97.

Key operation of F9 key (YES, step S78)

At step S79, the reference pattern of a bill or the like can be rewritten. That is, any desired pattern stored in the RAM 97 is selected by a key operation in the key board. The rewritten pattern is transmitted to the user at the time of the periodic transmission (see step S927 shown in FIG. 20 and step S560 shown in FIG. 16). In correspondence with the transmission, the CPU 11 gives an instruction to the CPU 41 to update the reference pattern stored in the EEP-ROM 49 (see step S303 shown in FIG. 12).

Next, a reception interruption processing executed by the CPU 91 is described below with reference to FIGS. 19 and 20.

When it is detected that data has been transmitted from the user to the modem 72 and an interruption has occurred in the CPU 91, a reception processing of ID from the data terminal DT1 is executed at step S901. If it is decided at step S903 that a communication error has occurred during the reception of data, the re-transmission of data is requested to the data terminal DT1 at step S913 provided that the number of the communication errors is within a limit (YES, at step S911). If it is decided at step S911 that the number of the errors has exceeded the limit, the communication line is disconnected, and the interruption terminates at step S931.

If it is decided at step S905 that the reception processing terminated, it is then decided whether or not the communication was made by a transmission due to some trouble. If YES at step S921, the type of trouble and the user's name are displayed on the display screen 92, and service data of the arrival time of a service man, for example, is calculated based on data, for managing service schedule, stored in the RAM 97, and then it is transmitted to the data terminal DT1 at step S923.

If it is decided at step S921 that the communication was not made by a transmission due to some trouble, it is then decided at step S925 whether or not the communication was made by the predetermined periodic transmission. If YES at step S925, the password of the copying apparatus 4 connected with the data terminal DT1 is updated and transmitted to the CPU 91. If the reference pattern of a bill or the like has been re-written as described above (step S79 of FIG. 18), the reference pattern stored in the RAM 97 is transmitted to update the data on the user's side.

Thereafter, the communication line is cut off at step S931 and a monthly total for each item is calculated, and instructions (for example, visiting time of a service man and parts which he should carry with him) are printed out, if necessary, at step S933.

According to the above construction, if it is decided that an original document read by the copying apparatus on the user's side is a bill or the like, the result of the decision is transmitted to the service center where one can know that a wrong copy was attempted on the user's side and can take any necessary countermeasure. In addition, such a wrong attempt is surely prevented by making known the fact that the copying system is provided with such a function that any wrong copy is reported to a third person or party.

Although the present invention has been fully described in connection with a preferred embodiment thereof with reference to the accompanying drawings, it is to be noted that various changes and modifications are apparent to those skilled in the art. For example, the first called party called when the original document to be copied proves to be the copy-prohibited one can be set to the police or a security company instead of the service center.

Furthermore, although it is shown above as a preferred embodiment that the copying system according to the present invention is constructed to be the one in which both the preliminary and main decisions are carried out in each copying apparatus, it can be constructed to be the copying system in which the preliminary decision is executed on the side of each copying apparatus while the main decision is done on the side of its controller. The modified copying system according the present invention is described below with reference to FIGS. 19, 21 and 22.

Figure 21:
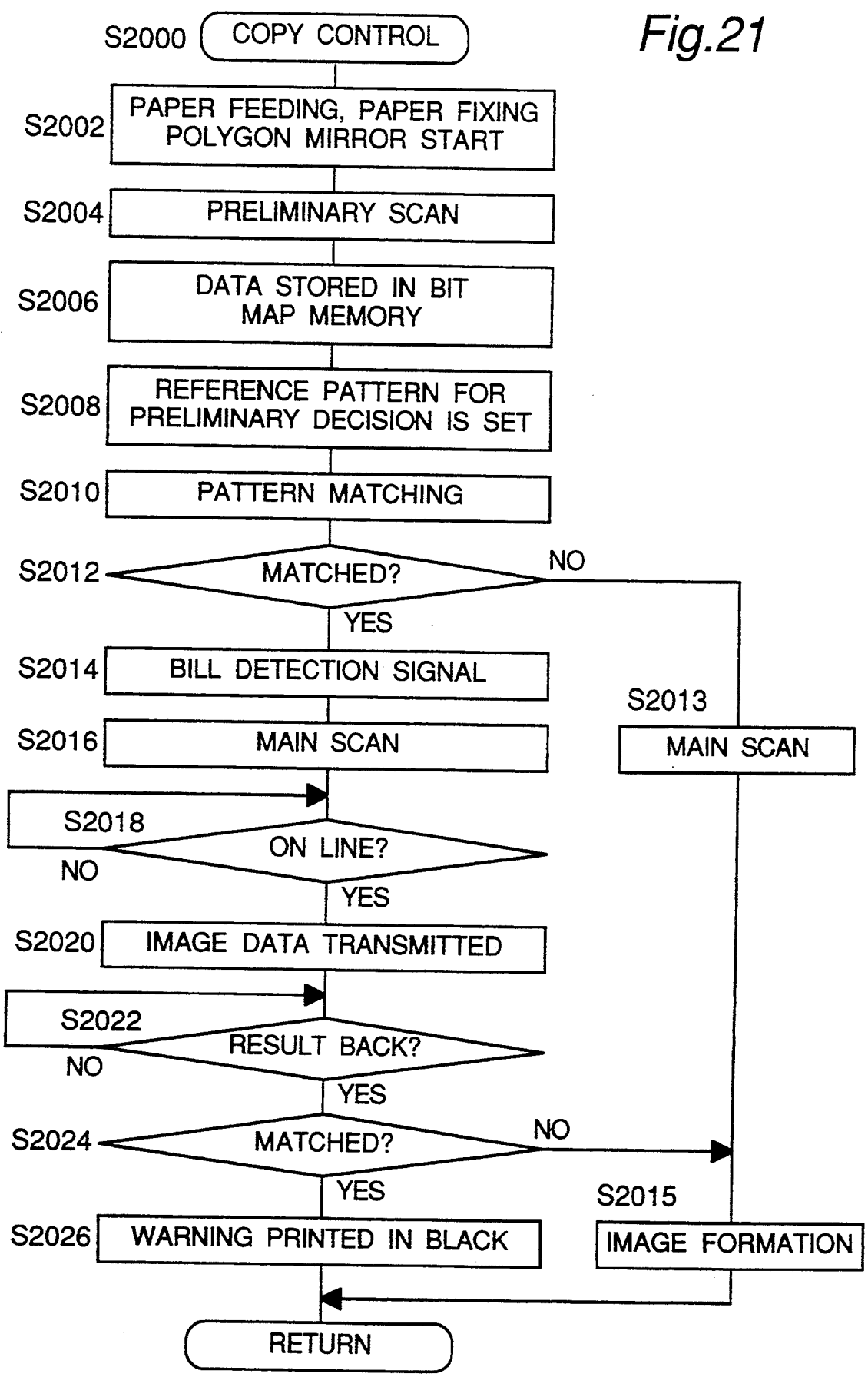
FIG. 21 is a modified flowchart similar to FIG. 7.

FIG. 21 is a flowchart showing a modified copy control processing, similar to FIG. 7. As shown in this figure, at step 2002 the CPU 41 gives an instruction that a copy sheet should be fed out from one of the paper trays 142–144 and tightly wound around the transfer drum 10, and that a polygon mirror disposed inside the laser device 21 should start rotating.

At step S2004, the CPU 41 gives an instruction to the image reading section 30 that a preliminary scan for detecting the size of an original document and the kind thereof should be carried out.

After the image data read at the step S2004 is stored in the bit map memory at step S2006, a reference pattern for the preliminary decision is set in a pattern-storing ROM at step S2008.

Then, at step S2010 is done a preliminary pattern matching by which it is decided whether or not the original document has a copy-prohibited image regardless of whether the original document is a bill, a check, securities or a credit voucher. And if at step 2012 is not detected a possibility that the original document is a bill or the like, after a main scanning is carried out at step S2013, the image of the original document is formed at step 2015.

On the other hand, if, at step S2012, a possibility that the original document is a bill or the like is detected, after a bill-detection signal is transmitted at step S2014, the main scan is executed at step S2016.

Then, after the communication circuit is connected and the signal indicating that it gets to be on line is sent back from the DT1 at step S2018, at step 2020 the signal of the image data is transmitted to the controller for the main decision.

Then, after the signal showing a result of the main decision done in the controller is sent back to the CPN 41 of the copying apparatus 4 at step S2022, it is decided at step S 2024 whether the signal sent back is the one indicating that the original document is a bill or not. And if it is decided at the step S2024 that the signal is the one indicating that the original document is not a bill, the abovementioned step S2015 is executed.

On the other hand, if it is decided at the step S2024 that the signal is the one indicating that the original document is a bill, step S2026 is executed at which a character of "invalid", instead of the image read at step S2016, is developed in black toner and transferred onto the copy paper, after an electrostatic latent image based on font data outputted from the warning font-generating section is formed on the photosensitive drum 24.

Figure 10:
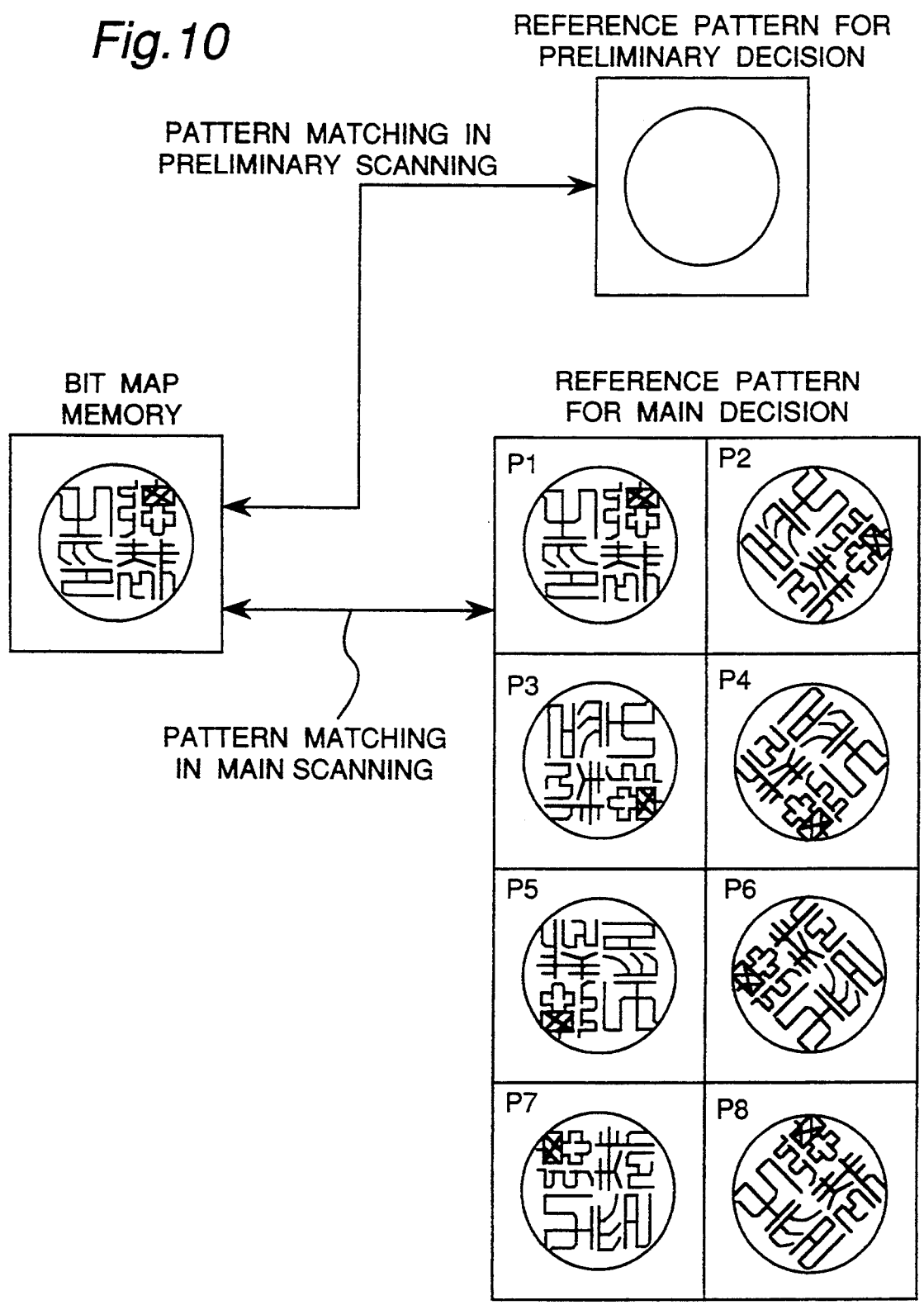
FIG. 10 is an explanatory view showing an example of a reference pattern used in the processing shown in FIG. 8.

Meanwhile, reference patterns, as shown in FIG. 10, for a preliminary and main decisions, are stored in RAM 97, and if at the abovementioned step S2010 is detected the possibiliy that the original document is a bill, a main decision is executed on the side of service center. The data processing carried out in CPU 91 is described below with reference to FIG. 19 and 22.

Figure 19:
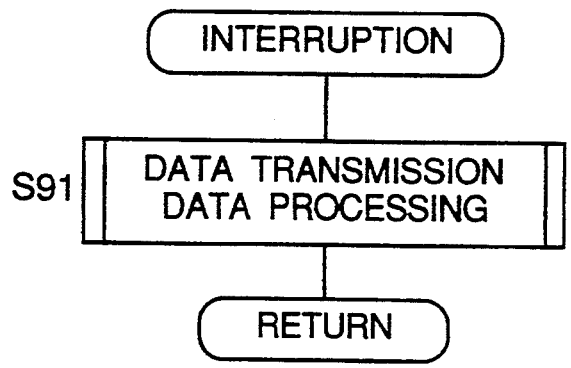
FIG. 19 is a flowchart showing a data processing executed by the CPU of the controller.
Figure 22:
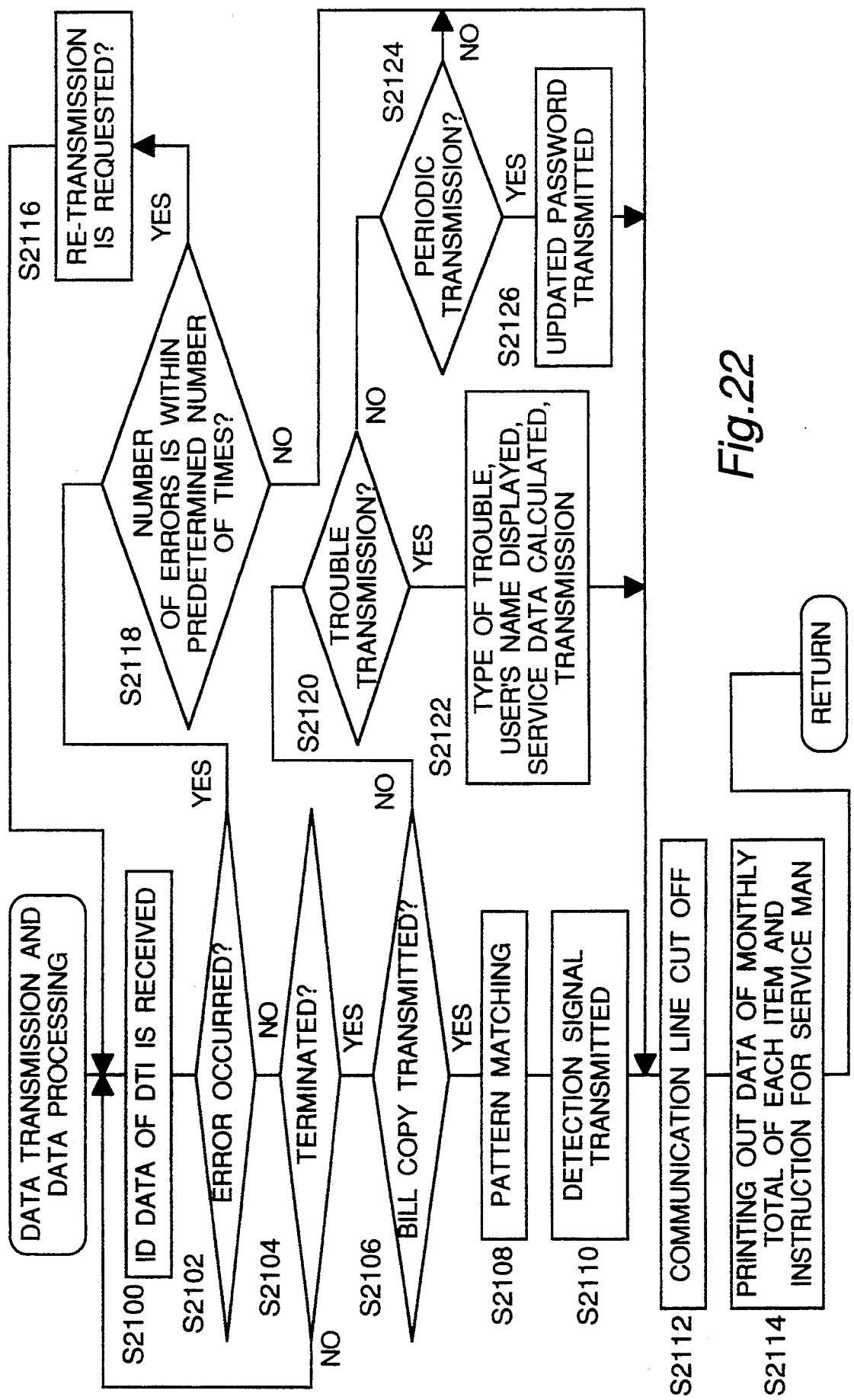
FIG. 22 is a modified flowchart similar to FIG. 20.

As shown in FIG. 19, when it is detected that data has been transmitted from the user to the modem 72 and an interruption has occurred in the CPU 91, as shown in FIG. 22, a reception processing of the ID from the data terminal DT1 is executed at step S2100. If it is decided at step S2102 that a communication error has occurred during the reception of data, the re-transmission of data is requested to the data terminal DT1 at step S2116 provided that the number of the communication errors is within a limit (YES, at step S2118). If it is decided at step S2118 that the number of the errors has exceeded the limit, the communication line is disconnected, and the interruption terminates at step S2112.

If it is decided at step S2104 that the reception processing terminated, it is then decided at step S2106 whether or not the data received this time is data indicating that the original document is a bill. And if it is decided at the step S2106 that the data received is data indicating that the original document is a bill, a main decision for examining the original document in detail to decide whether or not it is surely a bill is executed by using a method of pattern-matching at step S2108, and the result is transmitted to the DT1 of the corresponding copying apparatus 4 at step 2110.

On the other hand, if it is decided at step S2106 that the data received this time is data indicating that the original document is not a bill, step S2120 is executed where it is decided whether or not the data received this time is data indicating some troubled occurred on the user's side. And, if it is decided at the step S2120 that the data received is data indicating some trouble, step 2122 is executed by which the type of trouble and the user's name are displayed on the display screen 92, and after any service data such as the arrival time of a service man is calculated based upon data, for managing service schedule, stored in the RAM 97, the service data is transmitted back to the data terminal DT1 of the corresponding copying apparatus 4.

On the other hand, if it is decided at step 2120 that the data received this time is not data indicating some trouble, step 2124 is executed at which it is decided whether or not the communication made this time is the one due to the periodic transmission. And if it is decided at the step S2124 that the communication is not the one due to the periodic transmission, step S2112 is executed, while if it is decided at the step S2124 that the communication is the one due to the periodic transmission, the password of the copying apparatus 4 connected with the data terminal DT1 thereof is updated and transmitted to the CPU 91. If the reference pattern of a bill or the like has been re-written as described above (step S79 in FIG. 18), the reference pattern stored in the RAM 97 is transmitted to update the data on user's side. By the way, step S2114 shown in FIG. 22 is executed in the way similar to step S933 in FIG. 20.

Such changes and modifications as mentioned above are to be understood as included within the scope of the present invention as defined by the appended claims unless they depart therefrom.

What is claimed is:

1. A copying apparatus comprising:
   reading means for reading an image of an original document and outputting image data corresponding to the image read;
   recording means for recording the image corresponding to the image data on paper;
   deciding means for deciding whether or not the image read corresponds to an image which is prohibited from being copied;
   calling means for calling a predetermined called party via a communication line; and
   transmitting means for transmitting a result of the decision made by the deciding means to the called party by actuating the calling means, when it is decided by the deciding means that the image read by the reading means corresponds to the image which is prohibited from being copied.

2. A copying apparatus as claimed in claim 1, wherein the transmitting means transmits data for specifying the copying apparatus to the called party together with a result of decision made by the deciding means.

3. A copying apparatus as claimed in claim 1, wherein the deciding means and the recording means operate simultaneously.

4. A copying apparatus as claimed in claim 1, further comprising data storing means for storing data corresponding to the image which is prohibited from being copied, wherein the deciding means decides whether or not the image read by the reading means is the image which is prohibited from being copied by comparing the image data from the reading means with the data stored in the data storing means.

5. A copying apparatus as claimed in claim 1, further comprising data storing means for storing data used to call the desired called party, and updating means for updating the data stored in the storing means.

6. A copying apparatus as claimed in claim 1, further comprising data storing means for storing data used to call each of the desired called party arranged in an order of priority, wherein the called party is called one by one according to the order of priority when the called party in the highest priority cannot be called.

7. A copying apparatus as claimed in claim 1, wherein the deciding means decide whether or not the image read by the reading means is an image of a bill.

8. A copying apparatus as claimed in claim 3, further comprising control means for controlling the recording means so as to record a predetermined image on the image corresponding to the image data read by the reading means, when the image read thereby is decided by the deciding means as the image which is prohibited from being copied.

9. A copying apparatus as claimed in claim 1, wherein said calling means is also for deterring users from copying prohibited images.

10. A copying apparatus as claimed in claim 1, wherein said predetermined called party includes one of a police station or a security company.

11. A copying apparatus connected with a controller through a communication line comprising:
   reading means for reading an image of an original document and outputting image data corresponding to the image read;
   recording means for recording the image corresponding to the image data on paper;
   data storing means for storing data corresponding to an image which is prohibited from being copied;
   deciding means for deciding whether or not the image read by the reading means corresponds to the image which is prohibited from being copied, based on the data stored in the data storing means; and
   transmitting means for transmitting a result of the decision made by the deciding means to the controller through the communication line, when the image read by the reading means is decided as the image which is prohibited from being copied by the deciding means.

12. A copying apparatus as claimed in claim 11, further comprising:
   state-memorizing means for collecting and storing data with respect to a state of the copying apparatus, and
   transmission controlling means for controlling a timing of transmitting the data with respect to the state of the copying apparatus to the controller,
   wherein the transmitting means transmits the data stored in the state-memorizing means to the controller through the communication line, based on the timing controlled by the transmission controlling means.

13. A copying apparatus as claimed in claim 11, further comprising:
   number-of-paper memorizing means for counting and memorizing the number of paper used by the recording means, and
   transmission controlling means for controlling a timing of transmitting data of the number of paper to the controller,
   wherein the transmitting means transmits the data of the number of paper stored in the number-of-paper memorizing means to the controller through the communication line, based on the timing controlled by the transmission controlled means.

14. A copying apparatus as claimed in claim 11, wherein the transmitting means transmits data for specifying the copying apparatus to the controller together with a result of decision made by the deciding means.

15. A copying apparatus as claimed in claim 11, wherein the deciding means decide whether or not the image read by the reading means corresponds to an image of a bill.

16. A copying apparatus connected with a controller through a communication line comprising:
   reading means for reading an image of an original document and outputting image data corresponding to the image read;
   recording means for recording the image corresponding to the image data on paper;
   data storing means for storing data corresponding to a plurality of different types of images, each of which is prohibited from being copied;
   deciding means for deciding whether or not the image read by the reading means corresponds to the image which is prohibited from being copied, based on the data stored in the data storing means; and
   transmitting means for transmitting a result of the decision made by the deciding means together with data for specifying a type of the image to the controller through the communication line, when the image read by the reading means is decided as the image which is prohibited from being copied by the deciding means.

17. A controlling system having a plurality of copying apparatuses and a controller, for controlling each of the copying apparatuses, connected with the copying apparatuses through a communication line, in which the copying apparatus comprises:
   reading means for reading an image of an original document and outputting image data corresponding to the image read;
   recording means for recording the image corresponding to the image data on paper;
   information storing means for storing information upon deciding whether or not the data read by the reading means corresponds to an image which is prohibited from being copied;
   deciding means for deciding whether or not the image read by the reading means corresponds to the image which is prohibited from being copied, based on the information stored in the information storing means; and
   information updating means for updating the information stored in the information storing means, according to a signal transmitted from the controller through the communication line.

18. A controlling system claimed in claim 17, further comprising transmitting means for transmitting a result of decision made by the deciding means to the controller, when the image read by the reading means is decided as the image which is prohibited from being copied by the deciding means.

19. A controlling system claimed in claim 17, wherein the deciding means decides whether or not the image read by the reading means is an image of a bill.

20. A controlling system claimed in claim 17, wherein the information storing means stores data of an image which is prohibited from being copied, and the deciding means decides whether or not the image read by the reading means corresponds to the image which is prohibited from being copied by comparing the data stored in the information storing means with the image data outputted from the reading means.

21. A controlling system claimed in claim 18, further comprising:

state-memorizing means for storing data with respect to a state of the copying apparatus, and transmission controlling means for controlling a timing of transmitting the data with respect to the state of the copying apparatus per type of data to the controller, wherein the transmitting means transmits the data stored in the state-memorizing means to the controller through the communication line, based on the timing controlled by the transmission controlling means.

22. A controlling system claimed in claim 18, further comprising:

number-of-paper memorizing means for counting and memorizing the number of paper used by the recording means, and transmission controlling means for controlling a timing of transmitting data of the number of paper to the controller, wherein the transmitting means transmits the data of the number of paper stored in the number-of-paper memorizing means to the controller through the communication line, based on the timing controlled by the transmission controlling means.

23. A controlling system claimed in claim 20, in which the controller comprises:

data storing means for storing data corresponding to the image which is prohibited from being copied, and transmitting means for transmitting the data stored in the data storing means to the copying apparatus if the data stored therein is changed.

24. A controlling system having a plurality of copying apparatuses and a controller, for controlling each of the copying apparatuses, connected with the copying apparatuses through a communication line, in which the copying apparatus comprises:

reading means for reading an image of an original document and outputting image data corresponding to the image read, recording means for recording the image corresponding to the image data on paper, first transmitting means for transmitting the image data to the controller through the communication line, and prohibiting means for prohibiting an operation of the recording means in response to a signal, which prohibits copying, transmitted from the controller, whereas the controller comprises:

deciding means for deciding whether or not the data received from the copying apparatus corresponds to an image which is prohibited from being copied, and second transmitting means for transmitting the signal which prohibits copying to the copying apparatus through the communication line, if the deciding means decides that the data received from the copying apparatus corresponds to the image which is prohibited from being copied.

25. A controlling system as claimed in claim 24, in which the copying apparatus comprises:

data storing means for storing data corresponding to an outline characteristic of the image which is prohibited from being copied, and preliminary deciding means for deciding a possibility of whether or not the image read by the reading means corresponds to the image which is prohibited from being copied, based on the data stored in the data storing means, wherein the first transmitting means transmits the image data to the controller only if the preliminary deciding means decides the possibility that the image read by the reading means corresponds to the image which is prohibited from being copied.

26. A controlling system as claimed in claim 24, in which the controller comprises display means for displaying an image corresponding to the image data outputted from the copying apparatus, when the deciding means decides that the data received from the copying apparatus corresponds to the image which is prohibited from being copied.

27. A controlling system as claimed in claim 24, in which the controller comprises data storing means for storing data corresponding to a detail characteristic of the image which is prohibited from being copied, wherein the deciding means decides whether or not the image data transmitted from the copying apparatus corresponds to the image which is prohibited from being copied, based on the data stored in the data storing means.

28. A controlling system as claimed in claim 24, in which the controller comprises data storing means for storing data corresponding to different types of the images each of which is prohibited from being copied, wherein the deciding means decides whether or not the image data transmitted from the copying apparatus corresponds to the image which is prohibited from being copied, based on the data stored in the data storing means.

29. A controlling system as claimed in claim 24, wherein the deciding means decides whether or not the image read by the reading means is an image of a bill.

30. A controlling system as claimed in claim 25, wherein the data stored in the data storing means can be rewritten according to an instruction transmitted from the controller.

31. A controlling system having a plurality of copying apparatuses and a controller, for controlling each of the copying apparatuses, connected with the copying apparatuses through a communication line, in which the copying apparatus comprises:

reading means for reading an image of an original document and outputting image data corresponding to the image read, recording means for recording the image corresponding to the image data on paper, first data storing means for storing data corresponding to an outline characteristic of an image which is prohibited from being copied, preliminary deciding means for deciding-a possibility of whether or not the image read by the reading means corresponds to the image which is prohibited from being copied by comparing the image data outputted from the reading means with the data stored in the first data storing means, first transmitting means for transmitting the image data read by the reading means to the controller through the communication line if the preliminary deciding means decides the possibility that the image read by the reading means corresponds to the image which is prohibited from being copied, and prohibiting means for prohibiting an operation of the recording means in response to a signal, for prohibiting copying, outputted from the controller, whereas the controller comprises:

second data storing means for storing data corresponding to a detail characteristic of the image which is prohibited from being copied, main deciding means for deciding whether or not the image read by the reading means corresponds to the image which is prohibited from being copied by comparing the data stored in the second data storing means with the image data outputted from the copying apparatus, and second transmitting means for transmitting the signal for prohibiting copying to the copying apparatus through the communication line, when the main deciding means decides that the image read by the reading means corresponds to the image which is prohibited from being copied.

32. A controlling system as claimed in claim 31, the image which is prohibited from being copied is an image of a bill.

33. An apparatus, for reading an image, connected with a controller through a communication line, comprising:

reading means for reading an image of an original document and outputting image data corresponding to the image read;

deciding means for deciding whether or not the image read by the reading means corresponds to an image which is prohibited from being copied; and transmitting means for transmitting a result of decision made by the deciding means to the controller, when the deciding means decides that the image read by the reading means is the image which is prohibited from being copied.

34. A copying apparatus comprising:

reading means for reading an image of an original document and outputting image data corresponding to the image read;

recording means for recording the image corresponding to the image data on paper;

deciding means for deciding whether or not the image read corresponds to an image which is prohibited from being copied, wherein the recording means and the deciding means operate simultaneously;

slowing means for slowing an operation of the recording means while the deciding means is operating;

calling means for calling a predetermined called party via a communication line; and transmitting means for transmitting a result of the decision made by the deciding means to the called party by actuating the calling means when it is decided by the deciding means that the image read by the reading means corresponds to the image which is prohibited from being copied.

35. A copying apparatus comprising:

reading means for reading an image of an original document and outputting image data corresponding to the image read;

recording means for recording the image corresponding to the image data on paper;

deciding means for deciding whether or not the image read corresponds to an image which is prohibited from being copied;

calling means for calling a predetermined called party via a communication line;

transmitting means for transmitting a result of the decision made by the deciding means to the called party by actuating the calling means, when it is decided by the deciding means that the image read by the reading means corresponds to the image which is prohibited from being copied; and data storing means for storing data corresponding to the image which is prohibited from being copied, wherein the deciding means decides whether or not the image read by the reading means is the image which is prohibited from being copied by comparing the image data from the reading means with the data stored in the data storing means, the data storing means further including:

first storing means for storing data corresponding to an outline characteristic of the image which is prohibited from being copied; and second storing means for storing data corresponding to a detail charateristic of the image which is prohibited from being copied;

the deciding means for deciding whether or not the image read corresponds to an image which is prohibited from being copied further including:

preliminary deciding means for deciding whether or not there is a possibility that the image read by the reading means is the image which is prohibited from being copied by comparing the data stored in the first storing means with the image data read by the reading means; and main deciding means for deciding whether or not the image decided as the image which is prohibited from being copied by the preliminary deciding means is the image which is prohibited from being copied by comparing the data stored in the second storing means with the image read by the reading means.

36. A copying apparatus comprising:

an image reader which reads an image of an original document and which outputs image data corresponding to the image read;

a printer which prints the image corresponding to the image data on paper;

deciding means for deciding whether or not the image read corresponds to an image which is prohibited from being copied;

calling means for calling a predetermined called party via a communication line; and a transmitter which transmits a result of the decision made by said deciding means to the called party by actuating said calling means, when it is decided by said deciding means that the image read by said image reader corresponds to the image which is prohibited from being copied.

37. A controlling system having a plurality of copying apparatuses and a controller, for controlling each of said copying apparatuses, connected with said copying apparatuses through a communication line, in which said copying apparatuses comprise:

an image reader which reads an image of an original document and which outputs image data corresponding to said image read;

a printer which prints the image corresponding to the image data on paper;

an information memory which stores information upon deciding whether or not the data read by said image reader corresponds to an image which is prohibited from being copied;

deciding means for deciding whether or not the image read by said image reader corresponds to the image which is prohibited from being copied, based on the information stored in said information memory; and information updating means for updating the information stored in said information memory, according to a signal transmitted from the controller through the communication line.

38. A controlling system having a plurality of copying apparatuses and a controller, for controlling each of said copying apparatuses, connected with said copying apparatuses through a communication line, in which said copying apparatuses comprise:

an image reader which reads an image of an original document and which outputs image data corresponding to the image read;

a printer which prints the image corresponding to the image data on paper;

a first memory which stores data corresponding to an outline characteristic of an image which is prohibited from being copied;

preliminary deciding means for deciding a possibility of whether or not the image read by the image reader corresponds to the image which is prohibited from being copied by comparing the image data outputted from said image reader with the data stored in said first memory, a first transmitter which transmits the image data read by said image reader to said controller through the communication line if the preliminary deciding means decides the possibility that the image read by said image reader corresponds to the image which is prohibited from being copied, and prohibiting means for prohibiting an operation of said printer in response to a signal, for prohibiting copying, outputted from said controller, said controller comprising:

a second memory which stores data corresponding to a detail characteristic of the image which is prohibited from being copied, main deciding means for deciding whether or not the image read by the image reader corresponds to the image which is prohibited from being copied by comparing the data stored in said second memory with the image data outputted from said copying apparatus, and a second transmitter which transmits the signal for prohibiting copying to said copying apparatus through the communication line, when said main deciding means decides that the image read by said image reader corresponds to the image which is prohibited from being copied.

* * * * *